United States Patent [19]
Morita et al.

[11] Patent Number: 6,003,116
[45] Date of Patent: Dec. 14, 1999

[54] MULTIPLEXED COMPUTER SYSTEM WITH THE CAPABILITY TO COPY DATA FROM ONE PROCESSOR MEMORY TO ANOTHER

[75] Inventors: Yuuichiro Morita; Tetsuaki Nakamikawa, both of Hitachi; Shinichiro Yamaguchi, Mito; Naoto Miyazaki, Hitachi; Shin Kokura, Hitachi; Yoshihiro Miyazaki, Hitachi, all of Japan

[73] Assignee: Hitachi, Ltd., Tokyo, Japan

[21] Appl. No.: 08/739,393

[22] Filed: Oct. 29, 1996

[30] Foreign Application Priority Data

Nov. 7, 1995 [JP] Japan .................................. 7-288363

[51] Int. Cl.⁶ .............................. G06F 12/00; G06F 13/00
[52] U.S. Cl. .............................. 711/141; 711/5; 711/118; 711/135; 711/154; 711/167; 711/210
[58] Field of Search ..................... 711/3, 5, 118, 711/135, 141, 154, 167, 200, 210, 211, 272

[56] References Cited

U.S. PATENT DOCUMENTS

| | | | |
|---|---|---|---|
| 4,282,572 | 8/1981 | Moore, III et al. ........................ | 711/3 |
| 4,376,973 | 3/1983 | Chivers ....................................... | 711/3 |
| 5,202,980 | 4/1993 | Morita et al. ............................ | 395/575 |
| 5,222,229 | 6/1993 | Fukuda et al. ............................ | 395/550 |
| 5,479,625 | 12/1995 | Nishimukai et al. ...................... | 711/6 |
| 5,509,133 | 4/1996 | Nishimukai et al. ..................... | 711/113 |
| 5,619,677 | 4/1997 | Nishimukai et al. ..................... | 711/138 |
| 5,634,027 | 5/1997 | Saito .......................................... | 711/3 |

FOREIGN PATENT DOCUMENTS 3-182958  8/1991  Japan .

OTHER PUBLICATIONS

IEEE (1991), (Twenty–First FTCS 1991): Integrity S2: A Fault–Tolerant Unix Platform, Doug Jewett, Tandem Computers, Inc.

Primary Examiner—Tuan V. Thai
Attorney, Agent, or Firm—Kenyon & Kenyon

[57] ABSTRACT

A multiplexed computer system allows memory accessing by a processor, a peripheral equipment or a like apparatus even during execution of memory copying to improve the processing performance during on-line maintenance. To this end, the multiplexed computer system includes a plurality of processing units which carry out the same operation in synchronism with each other. Each of the processing units includes a copy processor register for designating a processor to read out contents of a memory unit, copying circuits which transfer copies of the stored contents of the memory unit and data to be written into the memory unit in the same order as that of accesses to the memory unit to a memory unit of another processing unit, a copy mode flag indicating that memory copying processing for making the stored contents of the memory unit of the self system and stored contents of the memory unit of the other processing unit coincide with each other is proceeding, and a copy task flag indicating that the processor is reading out, during memory copying processing, the stored contents of the memory unit.

4 Claims, 17 Drawing Sheets

COPY TRANSFER REGISTER (735a)

COPY TRANSFER REGISTER

|           | COPY | CAD1 | CAD2 | CAE1 | CAE2 |
|-----------|------|------|------|------|------|
| DSBA(70a) | 1    | 0    | 0    | 0    | 1    |
| DSBA(80a) | 0    | 0    | 1    | 0    | 1    |

MULTIPLEXED COMPUTER SYSTEM WITH THE CAPABILITY TO COPY DATA FROM ONE PROCESSOR MEMORY TO ANOTHER

FIELD OF THE INVENTION

This invention relates to a multiplexed computer system, and more particularly to a multiplexed computer system in which memory copying for putting memories of the multiplexed computer system into coincidence with each other is effected.

BACKGROUND OF THE INVENTION

A conventional multiplexed computer system wherein a plurality of processing units execute a same calculation in synchronism with each other requires means for putting stored contents of memories of all of the processing units into coincidence with each other in order to allow the processing units to perform a same operation in synchronism with each other, that is, to perform a multiplexed operation again after one of the processing units is disabled because of a failure or a periodic inspection is performed for a particular one of the processing units.

As a method of putting stored contents of memories of all processing units which operate, for example, in a duplicated condition into coincidence with each other, the following two memory copying methods are adopted usually.

In particular, as the first memory copying method, in a computer system which operates in a duplicated condition, an operation of copying a fixed region of stored contents of a memory provided in one of processing units which is operating (hereinafter referred to as normal system processing unit) into another memory provided in another one of the processing units which is not operating (hereinafter referred to as abnormal system processing unit) using data transfer means of the normal system processing unit between a memory and a peripheral equipment, that is, so-called DMA engine, is repetitively executed after each fixed interval of time. Further, where a processor provided in the normal system processing unit is constructed so that it can access only the memory in the same processing unit, data to be written from the processor provided in the normal system processing unit into the memory of the same processing unit are transferred to the memory provided in the abnormal system processing unit. An example which discloses a technique regarding this is Japanese Patent Laid-Open Application No. Hei 3-182958.

As the second memory copying method, in a computer system which includes processing units which operate in a triplicated condition and global memories which operate in a duplicated condition and wherein each of the processing units includes a local memory and data transfer means between the local memory and the global memories, that is, so-called DMA engine, an operation of copying a fixed region of stored contents of one of the global memories which is operating (normal system) into the other global memory which is not operating (abnormal system) via the local memory provided in the processing unit using the DMA engine provided in the processing unit is repetitively executed after each fixed interval of time until all regions of the memory are copied. It is to be noted that, while the stored contents of the memory are being transferred, accessing to the global memories by a peripheral equipment, that is, DMA, is inhibited. A technique regarding this is disclosed in Doug Jewett, "Integrity S2: A Fault-Tolerant Unix Platform", Twenty-First FTCS International symposium, Montreal, 1991.

A multiplexed computer system having an obstacle resisting function has a so-called on-line maintenance function of allowing repair or exchange a failed element while executing ordinary processing in order to allow a multiplexed operation to be performed again, and even while such on-line maintenance is performed, it is required to prevent deterioration of a processing performance. Accordingly, memory copying essentially required for on-line maintenance must be performed without making an obstacle to ordinary processing.

However, in memory copying in on-line maintenance, stored contents of the memory provided in the normal system processing unit which always vary by ordinary processing must be transferred to the memory provided in the abnormal system processing unit while maintaining the consistency, and the following problems which disturb this must be solved.

In particular, if the normal system processing unit reads out, immediately before certain regions of the memories provided in the normal system processing unit and the abnormal system processing unit are rewritten simultaneously by ordinary processing, the region of the memory thereof and transfers the thus read out data to the region of the memory of the abnormal system processing unit in order to perform memory copying, then after the regions of the memories of the normal system processing unit and the abnormal system processing unit are rewritten by ordinary processing, the data prior to such rewriting are copied into the region of the memory of the abnormal system processing unit. Consequently, the consistency between the memories of the normal system processing unit and the abnormal system processing unit is lost.

According to the first conventional method described above, memory coping is executed using the DMA engine provided in the normal system processing unit, and consequently, during execution of memory copying, DMA between the two system memories and a peripheral equipment by the DMA engine is not executed. Accordingly, during execution of memory copying, both of the memories are not rewritten by DMA, thereby solving the problem of the loss of the memory consistency described above.

Meanwhile, according to the second conventional system described above, memory copying is executed using a DMA engine provided in a processing unit, and consequently, during execution of memory copying, DMA between a local memory and the two system global memories by the DMA engine is not executed. Further, since DMA between a peripheral equipment and the two system global memories is inhibited during execution of memory copying, the two global memories are not rewritten by DMA during execution of memory copying, thereby solving the problem of the loss of the memory consistency described above.

However, those conventional methods have a problem in that, during execution of memory copying, DMA between a peripheral equipment and a memory and DMA between a local memory and a global memory cannot be executed. Further, they have another problem in that, since an operation of copying a fixed memory region by means of a DMA engine is executed repetitively after each fixed interval of time until all regions of the memory are copied, overheads by pre-processing for memory copying such as setting of a DMA engine or flushing of a cache memory are increased. It is to be noted that, since flushing of a cache memory is performed such that a region of the cache memory corresponding to a memory region to be copied is flushed before memory copying is executed and then, after copying of all of the memory regions is completed, the all regions of the cache memory are flushed again, cache flushing executed in memory copying is equal to the sum total of the memory capacity and the cache capacity. Those problems make causes of deterioration of the processing performance during on-line maintenance.

SUMMARY OF THE INVENTION

It is an object of the present invention to provide a memory copying method for a multiplexed computer system composed of a plurality of processing units which allows memory accessing by a processor or a peripheral equipment even during execution of memory copying and minimizes overheads by pre-processing for memory copying.

In order to attain the object described above, there is provided a multiplexed computer system which includes a plurality of processing units which effect a same operation in synchronism with each other, and one or a plurality of peripheral equipments capable of accessing all of the processing units and wherein each of the processing units at least includes a processor or processors which effect operation processing, a cache and a memory unit which is accessible by the processor or processors and the peripheral equipment or equipments and the plurality of processing units are communicatable with each other, wherein each of the processing units includes copying means for transferring stored contents read out from the memory unit by the processor or processors and copies of data to be written into the memory unit by the processor or processors or the peripheral equipment or equipments in the same order as that of accesses to the memory unit, a copy processor register for designating one of the processor or processors which is to execute reading out of stored contents of the memory unit in order to effect memory copying, a copy mode flag for indicating that memory copying processing for making the stored contents of the memory unit of the self system and stored contents of the memory unit or units of the processing unit or units of the other system or systems coincide with each other is proceeding, and a copy task flag for indicating that the memory copying processing is proceeding and the processor is reading out the stored contents of the memory unit in order to transfer the stored contents of the memory unit of the self system to the memory unit or units of the processing unit or units of the other system or systems. Further, as another means for achieving the object described above, there is provided a multiplexed computer system which includes a plurality of processing units which effect a same operation in synchronism with each other, and one or a plurality of peripheral equipments capable of accessing all of the processing units and wherein each of the processing units at least includes a processor or processors which effect operation processing, a cache and a memory unit which is accessible by the processor or processors and the peripheral equipment or equipments and the plurality of processing units are communicatable with each other, wherein each of the processing units includes copying means for transferring stored contents read out from the memory unit by the processor or processors and copies of data to be written into the memory unit by the processor or processors or the peripheral equipment or equipments in the same order as that of accesses to the memory unit, a copy processor register for designating one of the processor or processors which is to execute reading out of stored contents of the memory unit in order to effect memory copying, verification means for comparing a latest address read out by the designated processor with an address of a write access to the memory unit from any of the peripheral equipment or equipments and, when a difference between the two values is smaller than a value determined in advance, instructing the copying means to transfer a copy of the data in the write access to the memory unit to the memory unit or units of the other processing unit or units, but, when the difference between the two values is larger than the value determined in advance, instructing the copying means not to transfer the copy of the write access data to the memory unit to the memory unit or units of the other processing unit or units, a copy mode flag for indicating that memory copying processing for making the stored contents of the memory unit of the self system and stored contents of the memory unit or units of the processing unit or units of the other system or systems coincide with each other is proceeding, and a copy task flag for indicating that the memory copying processing is proceeding and the processor is reading out the stored contents of the memory unit in order to transfer the stored contents of the memory unit of the self system to the memory unit or units of the processing unit or units of the other system or systems.

Further, as a further means for achieving the object described above, there is provided a multiplexed computer system which includes a plurality of processing units which effect a same operation in synchronism with each other, and one or a plurality of peripheral equipments capable of accessing all of the processing units and wherein each of the processing units at least includes a processor or processors which effect operation processing, a cache and a memory unit which is accessible by the processor or processors and the peripheral equipment or equipments and the plurality of processing units are communicatable with each other, wherein each of the processing units further includes memory read-out means for reading out stored contents of the memory unit successively from all regions of the memory unit beginning with a top address or a last address, copying means for transferring stored contents read out from the memory unit by the memory read-out means and copies of data to be written into the memory unit by the processor or processors or the peripheral equipment or equipments to the memory unit or units of the other processing unit or units in the same order as that of the accesses to the memory unit, a copy address register for indicating an address which makes an object of copying of the memory unit, and a copy mode flag for indicating that memory copying processing for making the stored contents of the memory unit of the self system with stored contents of the memory unit or units of the processing unit or units of the other system or systems coincide with each other is proceeding.

Further, as a further means for achieving the object described above, there is provided a multiplexed computer system which includes a plurality of processing units which effect a same operation in synchronism with each other, and one or a plurality of peripheral equipments capable of accessing all of the processing units and wherein each of the processing units at least includes a processor or processors which effect operation processing, a cache and a memory unit which is accessible by the processor or processors and the peripheral equipment or equipments and the plurality of processing units are communicatable with each other, wherein each of the processing units further includes memory read-out means for reading out stored contents of the memory unit successively from all regions of the memory unit beginning with a top address or a last address, copying means for transferring stored contents read out from the memory unit by the memory read-out means and copies of data to be written into the memory unit by the processor or processors or the peripheral equipment or equipments to the memory unit or units of the other processing unit or units in the same order as that of the accesses to the memory unit, verification means for comparing a latest address read out by the memory read-out means with an address of a write access to the memory unit from any of the peripheral equipment or equipments and, when a difference between the two values is smaller than a value determined in advance, instructing the copying means to transfer a copy of the data in the write access to the memory unit to the memory unit or units of the other processing unit or units, but, when the difference between the two values is larger than the value determined in advance, instructing the copying means not to transfer the copy of the write access data to the memory unit or units of the other processing unit or units, a copy address register for indicating an address which makes an object of copying of the memory unit, and a copy mode flag for indicating that memory copying processing for making the stored contents of the memory unit of the self system with stored contents of the memory unit or units of the processing unit or units of the other system or systems coincide with each other is proceeding.

Thus, the memory read-out means designated by any of the processors or the copy processor register reads out all stored contents of the memory unit while the processing unit is effecting ordinary processing, and the copying means transfers the stored contents and copies of data to be stored into the memory unit from the processor or any of the peripheral equipment or equipments in the same order as the order of accesses to the memory unit to the memory unit or units of the other processing unit or units. Then, after all stored contents of the memory unit are read out by the memory read-out means, contents of the cache memory are written back into the memory unit by the processor, and the thus written back contents of the cache memory are transferred to the memory unit or units of the other processing unit or units by the copying means. Coincidence of the stored contents of the memory units of the plurality of processing units is achieved thereby.

DESCRIPTION OF THE PREFERRED EMBODIMENTS

Figure 1:
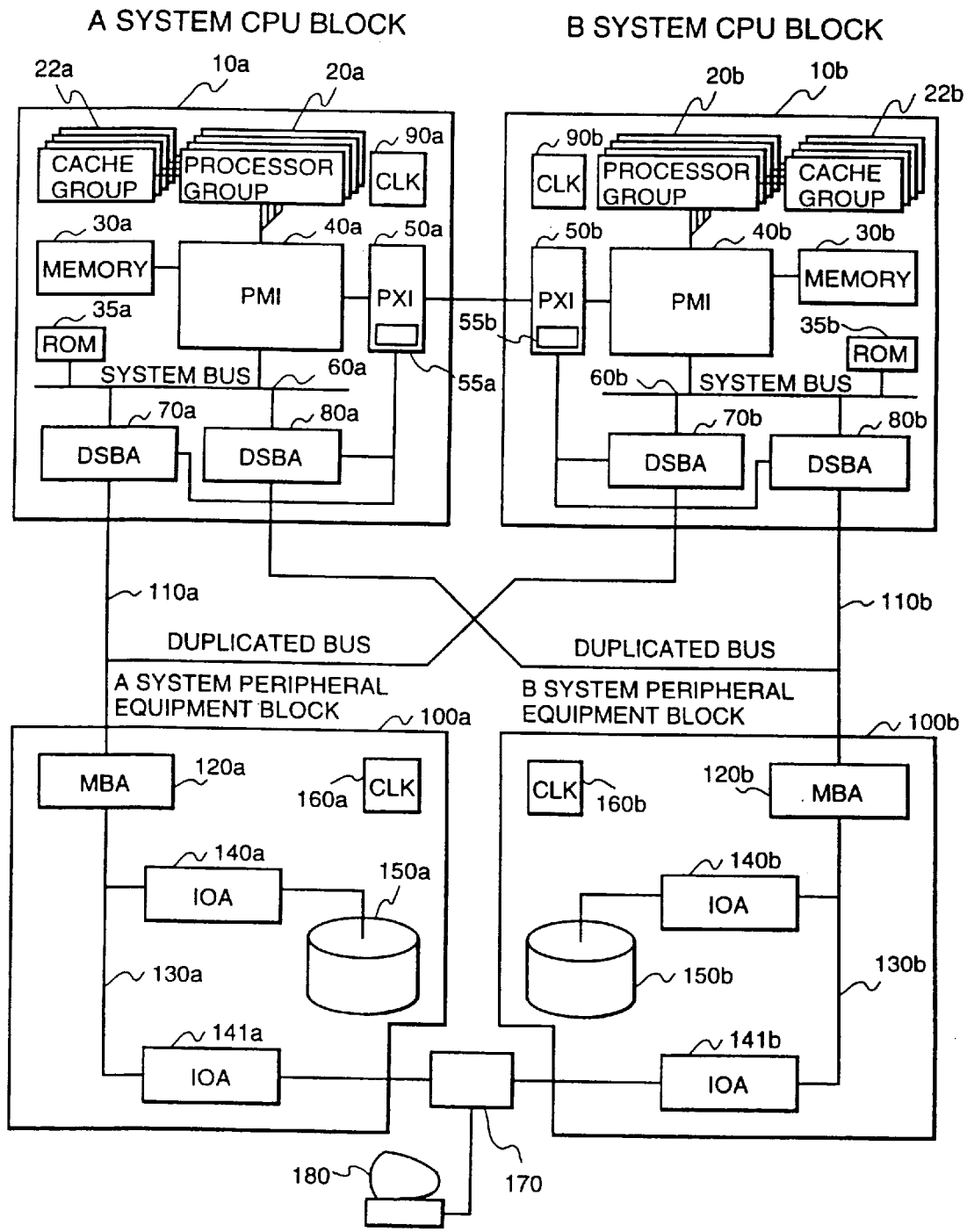
FIG. 1 is a block diagram of a duplicated computer system to which the present invention is applied.

In the following, preferred embodiments of the present invention will be described with reference to the drawings.
First Embodiment FIG. 1 is a block diagram showing a duplicated computer system to which the present invention is applied. The duplicated computer system includes an A system CPU block 10$a$ and a B system CPU block 10$b$ which perform predetermined operation processing, an A system peripheral equipment block 100$a$ including at least one peripheral equipment 150$a$, and a B system peripheral equipment block 100$b$ including at least one peripheral equipment 150$b$. The CPU blocks of the two systems and the A system peripheral equipment block 100$a$ are connected to each other by a duplicated bus 110$a$, and the CPU blocks of the two systems and the B system peripheral equipment block 100$b$ are connected to each other by another duplicated bus 110$b$. Further, the two system peripheral equipment blocks and a terminal equipment 180 are connected to each other by a terminal connection apparatus 170.

Components of the two systems which correspond to each other (which are denoted by like reference numerals with different suffixes annexed) have same functions, and the two systems have a same construction.

The A system CPU block 10$a$ includes at least a processor group 20$a$ including a plurality of processors which perform single or multiple processor operations, a cache group 22$a$ including caches individually connected to the processors of the processor group 20$a$, a memory 30$a$, a ROM 35$a$ in which at least a startup processing program and a fault recovery program are built in, a processor-memory interface 40$a$ called PMI, an inter-system interface 50$a$ called PXI, a plurality of duplicated bus control apparatus 70$a$ and 80$a$ called DSBA, and a system bus 60$a$ for connecting the PMI 40$a$ and the DSBAs 70$a$ and 80$a$ to each other. Similarly, the B system CPU block 10$b$ includes at least a processor group 20$b$ composed of the number of processors equal to the number of the processors of the processor group 20$a$ of the A system CPU block 10$a$, a cache group 22$b$ including caches individually connected to the processors of the processor group 20$b$, a memory 30$b$, a ROM 35$b$, a processor-memory interface 40$b$ called PMI, an inter-system interface 50b called PXI, a plurality of duplicated bus control apparatus 70b and 80b called DSBA, and a system bus 60b for connecting the PMI 40b and the DSBAs 70b and 80b.

While the ROM 35a and the ROM 35b are connected to the system bus 60a and the system bus 60b, respectively, they may be connected, for example, to the PMIs 40a and 40b or the PXIs 50a and 50b, respectively.

The A system CPU block 10a further includes a clock apparatus 90a for supplying a clock signal having the same frequency and the same phase as those of the B system CPU block 10b to the A system CPU block 10a and the B system CPU block 10b. Similarly, the B system CPU block 10b further includes a clock apparatus 90b for supplying a clock signal having the same frequency and the same phase as those of the A system CPU block 10a to the A system CPU block 10a and the B system CPU block 10b. Normally, only a clock signal supplied from one of the two clock apparatus is used commonly by the A system CPU block 10a and the B system CPU block 10b.

The A system CPU block 10a and the B system CPU block 10b perform the same operation, that is, synchronous operations in accordance with a period of a clock signal supplied thereto from one of the clock apparatus 90a and 90b. In short, the A system CPU block 10a and the B system CPU block 10b perform duplicated system operations in which the same operation processing is performed.

The A system CPU block 10a has at least three states of an on-line state, a disconnected state and a copying state, and one of the states is set to a state register 55a of the PXI 50a. The processor group 20a and the processor 20b can perform reading out from and writing into the state register 55a. Also the B system CPU block 10b is constructed in a similar manner. In the following, the three states will be described.

The on-line state is a state in which ordinary operation processing is performed, and when both of the A system CPU block 10a and the B system CPU block 10b are in the on-line state, the two system CPU blocks are performing synchronous operations.

The disconnected state is a state wherein transmission to the duplicated bus 110a and the duplicated bus 110b and reception from the duplicated bus 110a and the duplicated bus 110b are inhibited, that is, a state wherein the A system CPU block 10a or the B system CPU block 10b is logically disconnected from the duplicated computer system.

The copying state is a state wherein a copy of memory contents transmitted from the other system CPU block is received in order to make the memory of the self system CPU block coincident with the memory of the other system CPU block.

The A system peripheral equipment block 100a includes at least a peripheral equipment control apparatus 140a called IOA for controlling the peripheral equipment 150a, another peripheral equipment control apparatus 141a called IOA for controlling the terminal connection apparatus 170, an I/O bus 130a for connecting one or a plurality of IOAs 140a, an I/O bus control apparatus 120a called MBA having a function of connecting the I/O bus 130a and the duplicated bus 110a to each other to arbitrate accessing to the I/O bus 130a, and a clock apparatus 160a for supplying a clock signal to the A system peripheral equipment block 100a.

Similarly, the B system peripheral equipment block 100b includes at least a peripheral equipment control apparatus 140b called IOA for controlling the peripheral equipment 150b, another peripheral equipment control apparatus 141b called IOA for controlling the terminal connection apparatus 170, an I/O bus 130b for connecting one or a plurality of IOAs 140b, an I/O bus control apparatus 120b called MBA having a function of connecting the I/O bus 130b and the duplicated bus 110b to each other to arbitrate accessing to the I/O bus 130b, and a clock apparatus 160b for supplying a clock signal to the B system peripheral equipment block 100b.

The terminal equipment 180 can perform, for example, a maintenance operation for the duplicated computer system as an operator operates the terminal equipment 180.

If a user manually operates the terminal equipment 180 to request the duplicated computer system to perform predetermined processing, then the duplicated computer system executes the requested processing simultaneously by both of the A system CPU block 10a and the B system CPU block 10b. Consequently, even if a failure occurs with one of the CPU blocks to stop its processing, processing is executed continuously by the other CPU block, and accordingly, the requested processing is performed.

Figure 2:
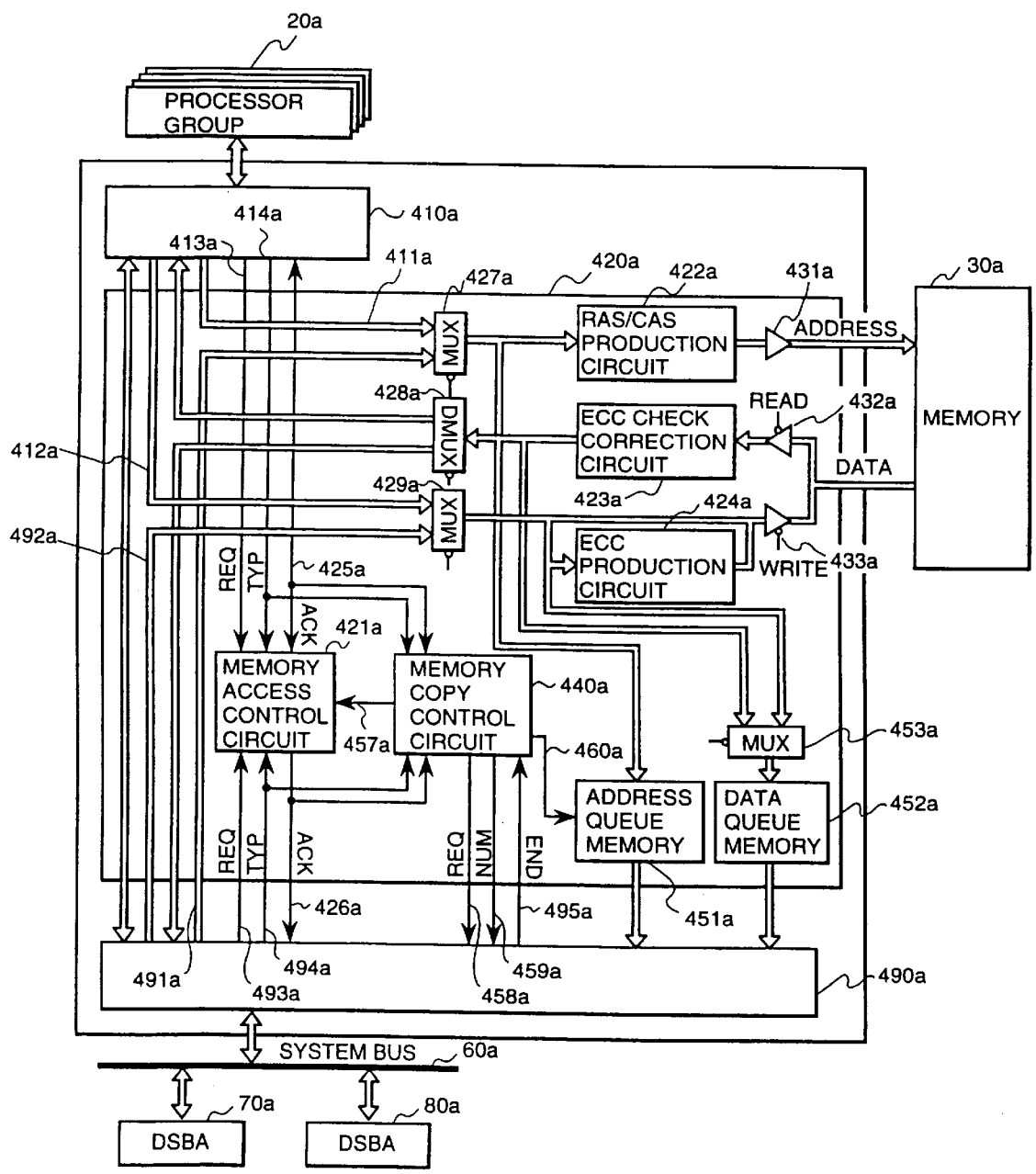
FIG. 2 is a block diagram of a processor-memory interface of the duplicated computer system of FIG. 1 showing a first preferred embodiment of the present invention.

Subsequently, a construction and operation of the PMI 40a which is a principal element of the present invention will be described with reference to FIG. 2. It is to be noted that also the PMI 40b is constructed and operates in a similar manner.

The PMI 40a includes a processor interface 410a which communicates data with the processor group 20a, a memory interface 420a for effecting reading out of and writing into the memory 30a, a system bus interface 490a for communicating data with the DSBAs 70a and 80a, and various logical operation elements.

The processor interface 410a requests the memory interface 420a for memory accessing in response to a memory access from the processor group 20a. Similarly, the system bus interface 490a requests the memory interface 420a for memory accessing in response to a memory access from the DSBA 70a or the DSBA 80a. The memory interface 420a arbitrates the memory access requests from the processor interface 410a and the system bus interface 490a to execute desired memory accessing. The maximum data length accessed by a single memory accessing operation is equal to the data line length of the cache group 22a. A data line is composed of data of a plurality of bytes and allocated to successive address regions. It is to be noted that a memory access from the DSBA 70a or the DSBA 80a is produced by data transfer from the peripheral equipment 150a or 150b, that is, so-called DMA (Dynamic Memory Access). Further, the processor interface 410a requests the system bus interface 490a for PIO accessing in response to a read or write access, that is, a so-called PIO (Peripheral Input/Output) access of any of various registers provided in the components connected to the system bus 60a from the processor group 20a, and the system bus interface 490a executes desired PIO accessing to any of the various registers of the components connected to the system bus 60a in response to such PIO accessing request.

A further detailed construction of the memory interface 420a will be described.

The memory interface 420a includes a memory access control circuit 421a, an RAS/CAS production circuit 422a for producing a row address and a column address of the memory 30a, an ECC check correction circuit 423a for detecting and correcting a bit error of read data read out from the memory 30a using an ECC (Error Correcting Code), an ECC production circuit 424a for producing an ECC for write data to be written into the memory 30a, and various logic operation devices.

Subsequently, a basic operation of the memory interface 420a will be described.

If the processor interface 410a outputs a memory access request signal 413a and an access type code signal 414a, which indicates read/write and a data length, to the memory access control circuit 421a and similarly the system bus interface 490a outputs a memory access request signal 493a and an access code type signal 494a to the memory access control circuit 421a, then the memory access control circuit 421a refers to those signals and selects one of the memory accesses from the processor interface 410a and the system bus interface 490a based on a preferential order set in advance, and then outputs a access acceptance signal 425a or 426a to the interface which is the access source of the selected memory access. Further, a multiplexer 427a is changed over so that a selected one of memory access addresses 411a and 491a outputted from the processor interface 410a and the system bus interface 490a is transmitted to the RAS/CAS production circuit 422a, and a row address and a column address produced by the RAS/CAS production circuit 422a are transmitted to the memory 30a via a buffer 431a.

Further, the memory access control circuit 421a changes over, if the selected memory access is a write address, a multiplexer 429a to transmit a selected one of memory write data 412a and 492a outputted from the processor interface 410a and the system bus interface 490a to the memory via a buffer 433a together with the ECC produced by the ECC production circuit 424a. Or, if the selected memory access is a read access, then the memory access control circuit 421a transmits read data read out from the memory 30a via a buffer 432a to the ECC check correction circuit 423a, and changes over a demultiplexer 428a so that read data after ECC checking and correction have been performed are transmitted to a selected one of the processor interface 410a and the system bus interface 490a.

Subsequently, components for memory copying will be described.

The memory interface 420a further includes, in order to perform so-called memory copying wherein data stored in the memory 30a are copied into the memory 30b of the B system CPU block 10b to make the memory 30b coincident with the memory 30a, an address queue memory 451a for storing an access address selected by the multiplexer 427a, a data queue memory 452a for storing write data selected by the multiplexer 429a and read data outputted from the ECC check correction circuit 423a, a multiplexer 453a for selecting write data and read data to be stored into the data queue memory 452a, and a memory copy control circuit 440a for performing reading out of the memory 30a and controlling the address queue memory 451a and the data queue memory 452a. It is to be noted that, since the A system CPU block 10a executes memory copying in parallel to ordinary processing, during copying, not only data stored in the memory 30a are copied, but also write data to be written into the memory 30a are copied in order to maintain the coincidence between the memory 30a and the memory 30b which always varies by ordinary processing.

Figure 3:
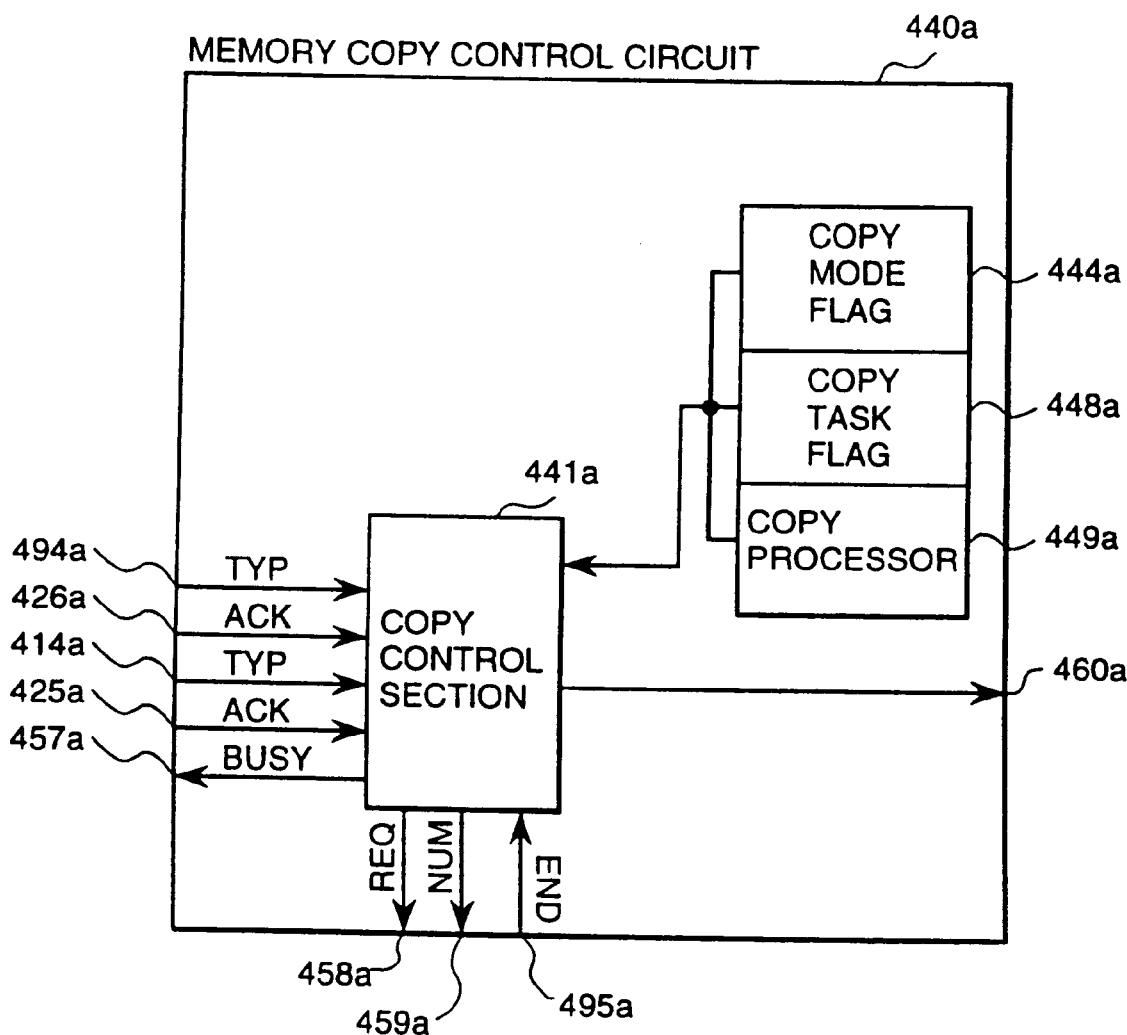
FIG. 3 is a block diagram of a memory copy control circuit of the processor-memory interface of FIG. 2.

FIG. 3 is a block diagram of the memory copy control circuit 440a.

The memory copy control circuit 440a includes a copy mode flag 444a indicating that memory copying is proceeding, a copy task flag 448a indicating that the processor is performing reading out of the memory 30a, that is, the processor is performing copying of stored contents of the memory 30a in order to perform memory copying, a copy processor register 449a indicating the number of a processor which executes memory reading out for memory copying, and a copy control section 441a for controlling the address queue memory 451a and the data queue memory 452a.

The copy mode flag 444a, copy task flag 448a and copy processor register 449a can be written/read out by the processor group 20a.

The copy control section 441a refers to the copy mode flag 444a, the access type code signals 414a and 494a and the access acceptance signals 425a and 426a and, if the copy mode flag 444a is set to 1, then the copy control section 441a stores, in response to the access acceptance signal 425a to a memory write request from the processor interface 410a, a write address outputted from the multiplexer 427a and write data outputted from the multiplexer 429a into the address queue memory 451a and the data queue memory 452a, respectively. Further, in response to the access acceptance signal 426a to a memory write request from the system bus interface 490a, the copy control section 441a stores a write address outputted from the multiplexer 427a and write data outputted from the multiplexer 429a into the address queue memory 451a and the data queue memory 452a, respectively.

On the other hand, if the copy task flag 448a is set to 1, then the copy control section 441a stores, in response to the access acceptance signal 425a to a memory write request from the processor interface 410a, a write address outputted from the multiplexer 427a and write data outputted from the multiplexer 429a into the address queue memory 451a and the data queue memory 452a, respectively. Further, in response to the access acceptance signal 425a to a memory read request from the processor interface 410a whose access source is a processor designated by the copy processor register 449a, the copy control section 441a stores a read address outputted from the multiplexer 427a and read data outputted from the ECC check correction circuit 423a into the address queue memory 451a and the data queue memory 452a, respectively. Furthermore, in response to the access acceptance signal 426a to a memory write request from the system bus interface 490a, the copy control section 441a stores a write address outputted from the multiplexer 427a and write data outputted from the multiplexer 429a into the address queue memory 451a and the data queue memory 452a, respectively. It is to be noted that locations of the address queue memory 451a and the data queue memory 452a into which an address and data are to be stored are designated by a pointer 460a.

The copy control section 441a further outputs to the system bus interface 490a, after memory access addresses and data are stored into the address queue memory 451a and the data queue memory 452a, respectively, a copy transmission request signal 458a and a pointer 459a representative of a position at which an address and data to be transferred are stored in order to transfer the data to the memory 30b of the B system CPU block 10b in the order in which they have been stored. The system bus interface 490a reads out an address and data indicated by the pointer 459a from the address queue memory 451a and the data queue memory 452a, respectively, in response to the copy transmission request signal 458a, adds an identifier representing copying to the thus read out address and data and transmits them to the system bus 60a. This identifier can be realized, for example, by allocating one of patterns of type codes representative of kinds of bus accesses in the system bus 60a. The system bus interface 490a outputs a copy transmission end signal 495a to the copy control section 441a after copying transmission to the system bus 60a is completed. When the copy transmission end signal 495a is received, the copy control section 441a requests the system bus interface 490a for next copying transmission by a next operation similar to that described above.

Figure 4:
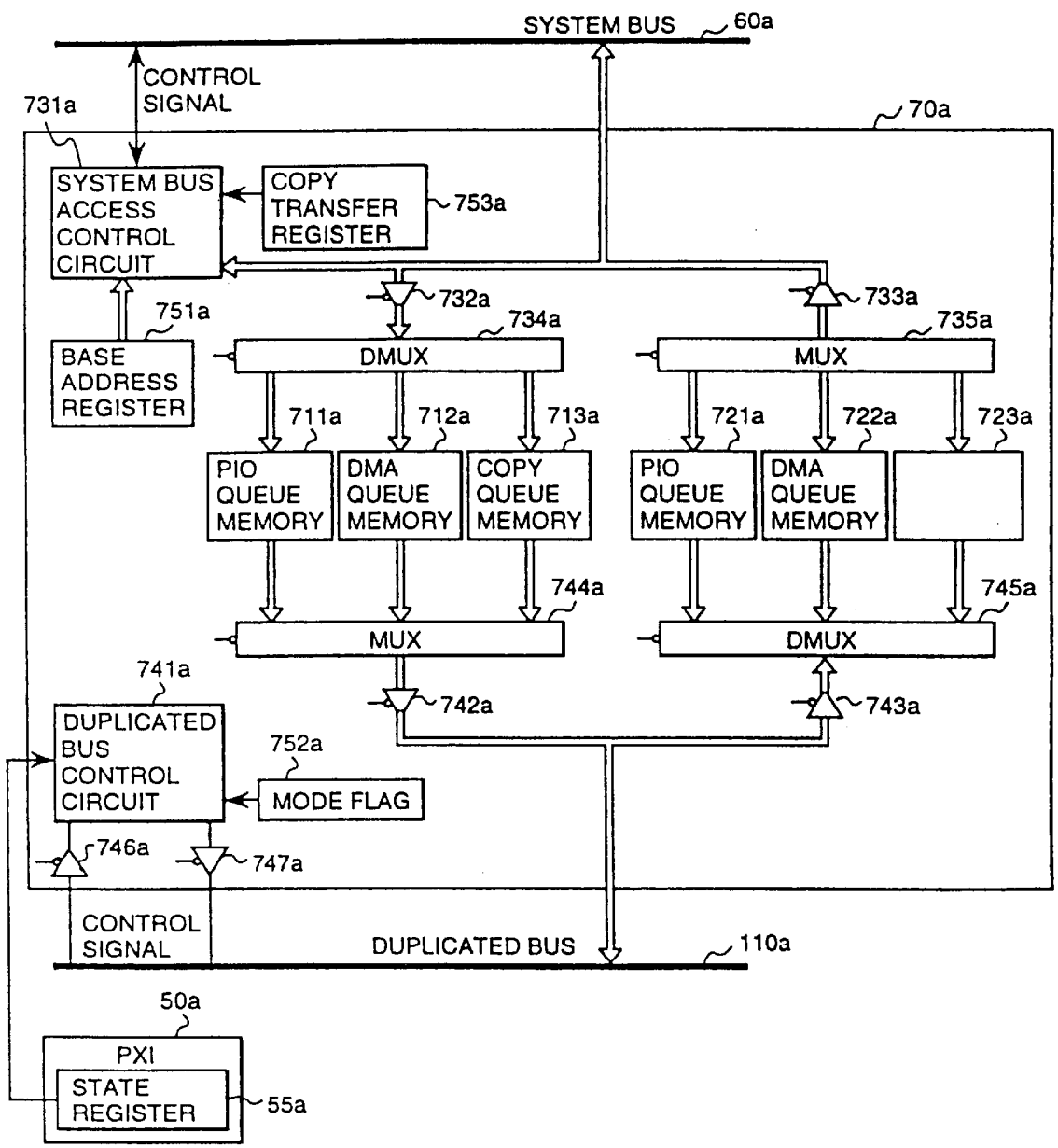
FIG. 4 is a block diagram of a DSBA of the duplicated computer system of FIG. 1.

If the address queue memory 451a and the data queue memory 452a become full, then the copy control section 441a outputs a BUSY signal 457a to the memory access control circuit 421a, and in response to the BUSY signal 457a, the memory access control circuit 421a inhibits memory accessing which requires copying. For example, when the copy mode flag 444a is set to 1 and the copy task flag 448a is set to 0, while the BUSY signal 457a is outputted, a write access by the processor and a write access by DMA are rejected, but when the copy task flag 448a is set to 1, while the BUSY signal 457a is outputted, read and write accesses by the processor and a write access by DMA are rejected. Failure in memory copying is prevented thereby. subsequently, a construction and operation of the DSBAs 70a, 80a, 70b and 80b will be described with reference to FIG. 4.

The DSBA 70a includes a PIO queue memory 711a for storing a PIO read address and PIO write address/data received from the system bus 60a together with an access type code corresponding to them, a DMA queue memory 712a for storing DMA read data received from the system bus 60a together with a corresponding access type code, a copy queue memory 713a for storing copy address/data received from the system bus 60a together with a corresponding access type code, a PIO queue memory 721a for storing PIO read data received from the duplicated bus 110a together with a corresponding access type code, a DMA queue memory 722a for storing a DMA read address and DMA write address/data received from the duplicated bus 110a together with an access type code corresponding to them, a copy queue memory 723a for storing copy address/data received from the duplicated bus 110a together with a corresponding access type code, a system bus access control circuit 731a for controlling communication of the system bus 60a, a duplicated bus control circuit 741a for controlling the duplicated bus 110a, a base address register 751a for indicating an I/O address region of the A system peripheral equipment block connected to the DSBA 70a via the duplicated bus 110a, a copy transfer register 753a for indicating that copy address/data from the PMI 40a are to be accepted, a mode flag 752a for indicating a mode of the DSBA 70a, and various logic operation devices. Also the DSBAs 80a, 70b and 80b have a similar construction.

It is to be noted that the system bus 60a and the duplicated bus 110a may transmit an address and data in time division using the same signal line or using separate signal lines. Further, the base address register 751a, copy transfer register 753a and mode flag 752a can be written/read out by the processor group 20a.

The system bus access control circuit 731a compares an address outputted to the system bus 60a by the PMI 40a with a value of the base address register 751a, and if the address outputted is within the I/O address region of the A system peripheral equipment block connected to the DSBA 70a, then the access is received by the system bus access control circuit 731a via a buffer 732a and stored into a predetermined queue memory by a demultiplexer 734a. However, reception of copy address/data is defined by setting of the copy transfer register 753a.

Figures 5, 8:
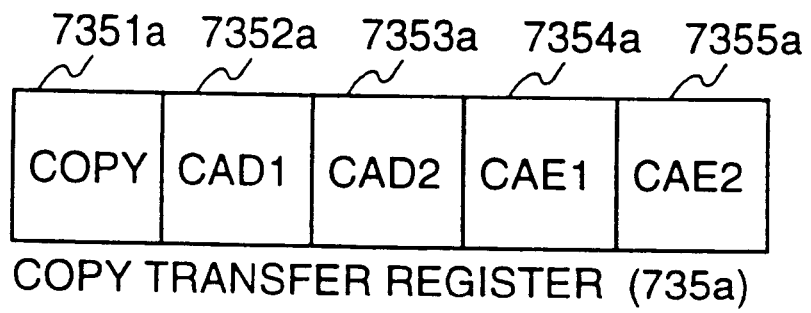
FIG. 5 is a diagrammatic view showing a detailed construction of a copy transfer register of the DSBA of FIG. 4.
FIG. 8 is a table illustrating operation of the duplicated computer system of FIG. 1.

Referring to FIG. 5, the copy transfer register 753a includes a COPY flag 7531a for indicating that copy address/data from the PMI 40a are to be accepted, a CAD1 flag 7532a and a CAD2 flag 7533a for indicating values of the lowest two bits of a copy address to be accepted, and a CAE1 flag 7534a and a CAE2 flag 7535a for indicating that the CAD1 flag 7532a and the CAD2 flag 7533a are valid, respectively. For example, if the COPY flag 7531a is set to 1, the CAE1 flag 7534a to 0 and the CAE2 flag 7535a to 1, then the system bus access control circuit 731a accepts copy address/data from the PMI 40a only if the value of the lowest one bit of the address is equal to a value set to the CAD1 flag 7532a, or if the COPY flag 7531a is set to 1, the CAE1 flag 7534a to 1 and CAE2 flag 7535a to 1, then the system bus access control circuit 731a accepts copy address/data from the PMI 40a only if the values of the lowest two bits of the address are equal to values set to the CAD1 flag 7532a and the CAD2 flag 7533a. The copy transfer register 753a stores copy addresses/data accepted in this manner into the copy queue memory 713a selected by the demultiplexer 734a.

The system bus access control circuit 731a further selects addresses, data and access type codes stored in one of the PIO queue memory 721a, DMA queue memory 722a and copy queue memory 723a in accordance with a predetermined preferential order by means of a multiplexer 735a and outputs them to the system bus 60a via a buffer 733a.

The DSBA 70a can be set to one of a primary mode and a secondary mode by the mode flag 752a. The DSBA in the primary mode outputs address/data and a control signal to a duplicated bus, but the DSBA in the secondary mode inhibits outputting of address/data and a control signal to the duplicated bus. This prevents collision of outputting from the A system CPU block 10a and the B system CPU block 10b to the duplicated bus 110a or the duplicated bus 110b. Accordingly, one of the DSBA 70a and the DSBA 70b is set to the primary mode while the other is set to the secondary mode, and one of the DSBA 80a and the DSBA 80b is set to the primary mode while the other is set to the secondary mode.

The duplicated bus control circuit 741a receives an address, data and an access type code outputted to the duplicated bus 110a by the MBA 120a via a buffer 743a and stores them into a predetermined queue memory by means of a demultiplexer 745a.

The duplicated bus control circuit 741a further selects addresses, data and access type codes stored in one of the PIO queue memory 711a, DMA queue memory 712a and copy queue memory 713a in accordance with a preferential order set in advance by means of a multiplexer 744a and outputs them to the duplicated bus 110a via a buffer 742a.

The duplicated bus control circuit 741a controls a duplicated bus in accordance with a state of the A system CPU block 10a indicated by the state register 55a of the PXI 50a and a mode indicated by the mode flag 752a. In particular, in an on-line state and the primary mode, the duplicated bus control circuit 741a receives a control signal, an address, data and an access type code from the duplicated bus 110a and transmits the control signal, address, data and access type code to the duplicated bus 110a via buffers 747a and 742a.

In an on-line state and the secondary mode, the duplicated bus control circuit 741a receives a control signal, an address, data and an access type code from the duplicated bus 110a via buffers 746a and 743a. However, the duplicated bus control circuit 741a inhibits outputting of the control signal, address, data and access type code to the duplicated bus 110a by normally keeping the buffers 747a and 742a in a high impedance state. However, the duplicated bus control circuit 741a presumably regards that it has outputted the control signal, address, data and access type code to the duplicated bus 110a.

In a copying state, all DSBAs are set to the secondary mode, and the bus access type code of the duplicated bus 110a is supervised so that only memory copy address/data and a type code transmitted from the other system CPU block are received while a DMA write access transmitted from the MBA 120a is not received. Outputting of a control signal, an address, data and an access type code to the duplicated bus 110a is inhibited by normally keeping the buffers 747a and 742a in a high impedance state.

In a disconnected state, a control signal, an address, data and an access type code received from the duplicated bus 110a are abandoned whereas outputting of a control signal, an address, data and an access type code to the duplicated bus 110a is inhibited by normally keeping the buffers 747a and 742a in a high impedance state.

Subsequently, data transfer, that is, so-called DMA (Dynamic Memory Access), between the memory 30a or 30b and the peripheral equipment 150a or 150b when the A system CPU block 10a and the B system CPU block 10b are in an on-line state, that is, are operating in synchronism with each other, will be described with reference to FIGS. 1, 6 and 7.

When the A system CPU block 10a and the B system CPU block 10b are in an on-line state, the DSBAs 70a and 80a are set to the primary mode while the DSBAs 70b and 80a are set to the secondary mode.

DMA is executed by the IOAs 140a and 140b. Since memory accessing by DMA is executed quite independently of memory accessing by any processor, contention between a memory access by DMA and another memory access by a processor occurs in the PMI 40a and the PMI 40b. However, the memory interfaces 420a and 420b arbitrate the memory accesses so that desired memory accessing may be executed as described hereinabove.

Figure 6:
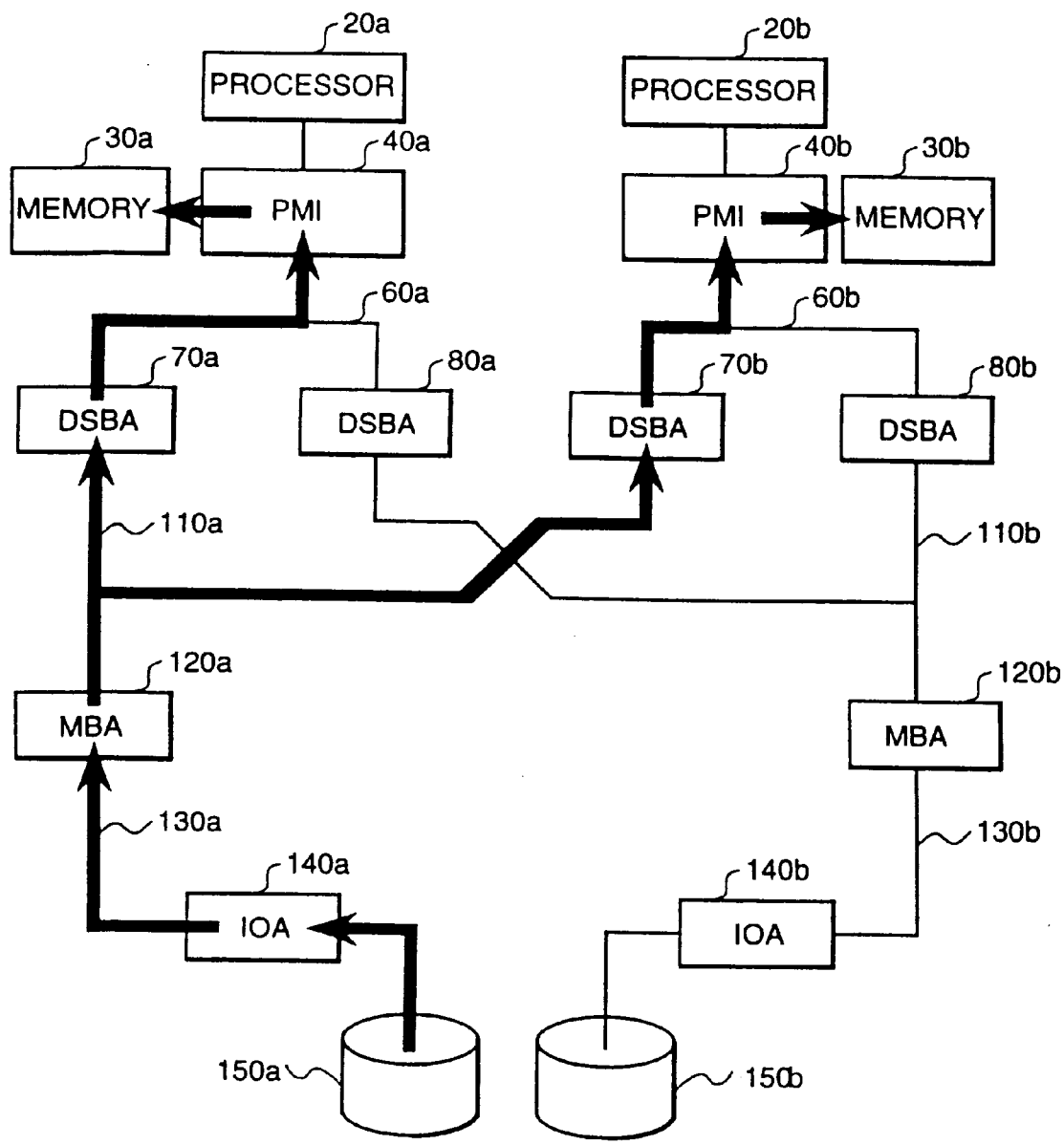
FIG. 6 is a diagrammatic view illustrating an operation of the duplicated computer system of FIG. 1.

FIG. 6 illustrates DMAs from the peripheral equipment 150a to the memory 30a and the memory 30b. The IOA 140a transmits data read out from the peripheral equipment 150a to the MBA 120a via the I/O bus 130a. The MBA 120a outputs the thus received data to the duplicated bus 110a. The DSBA 70a and the DSBA 70b simultaneously receive the data outputted to the duplicated bus 110a and simultaneously transmits the data to the PMI 40a and the PMI 40b via the system bus 60a and the system bus 60b, respectively. The PMI 40a and the PMI 40b write the received data simultaneously into the memory 30a and the memory 30b, respectively. DMAs from the peripheral equipment 150b to the memory 30a and the memory 30b proceed in a similar manner.

Figure 7:
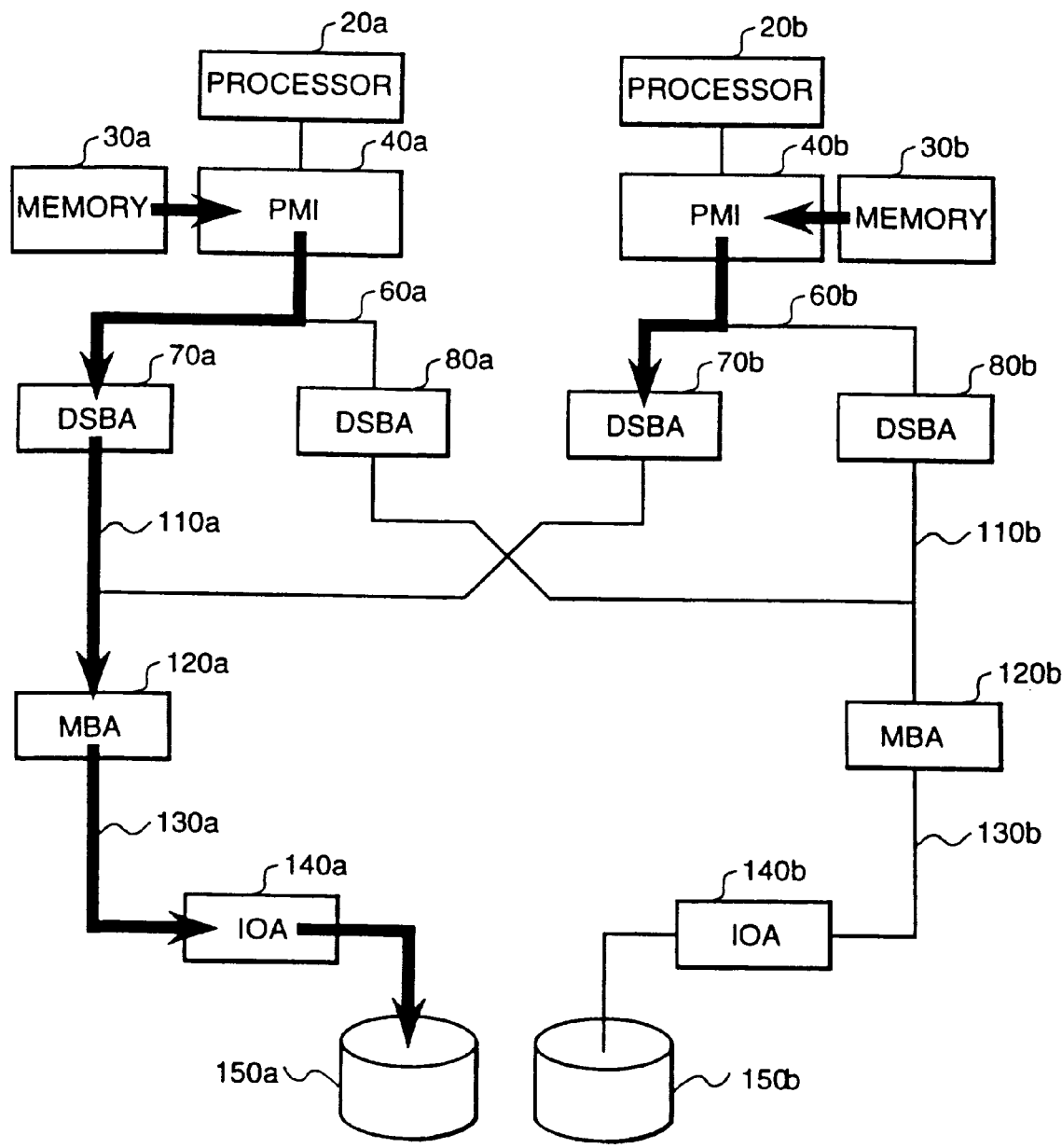
FIG. 7 is a similar view but illustrating another operation of the duplicated computer system of FIG. 1.

FIG. 7 illustrates DMAs from the memory 30a and the memory 30b to the peripheral equipment 150a. The PMI 40a and the PMI 40b transmit data read out simultaneously from the memory 30a and the memory 30b to the DSBA 70a and the DSBA 70b via the system bus 60a and the system bus 60b, respectively. The DSBA 70a and the DSBA 70b transmit the thus received data to the MBA 120a via the duplicated bus 110a. However, actually the data are outputted to the duplicated bus 110a only from the DSBA 70a which is in the primary mode while the DSBA 70b which is in the secondary mode does not output the data. This prevents a signal of the duplicated bus 110a from being rendered unstable by simultaneous driving of the duplicated bus 110a by the DSBA 70a and the DSBA 70b. The MBA 120a transmits the thus received data to the IOA 140a via the I/O bus 130a, and the IOA 140a transmits the thus received data to the peripheral equipment 150a. DMAs also from the memory 30a and the memory 30b to the peripheral equipment 150b proceed in a similar manner.

Subsequently, copy transfer when the A system CPU block 10a is in an on-line state and the B system CPU block 10b is in a copying condition, that is, when memory copying from the memory 30a to the memory 30b is proceeding, will be described with reference to FIGS. 1, 8, 9, 10 and 11.

When the A system CPU block 10a is in an on-line state and the B system CPU block 10b is in a copying state, the DSBAs 70a and 80a are set to the primary mode and the DSBAs 70b and 80b are set to the secondary mode. Further, the copy transfer registers of the DSBAs 70a and 80a are set in such a manner as illustrated in FIG. 8 so that a copy whose address is an even number is transferred via the duplicated bus 110a by the DSBA 70a whereas another copy whose address is an odd number is transferred via the duplicated bus 110b by the DSBA 80a.

Figure 9:
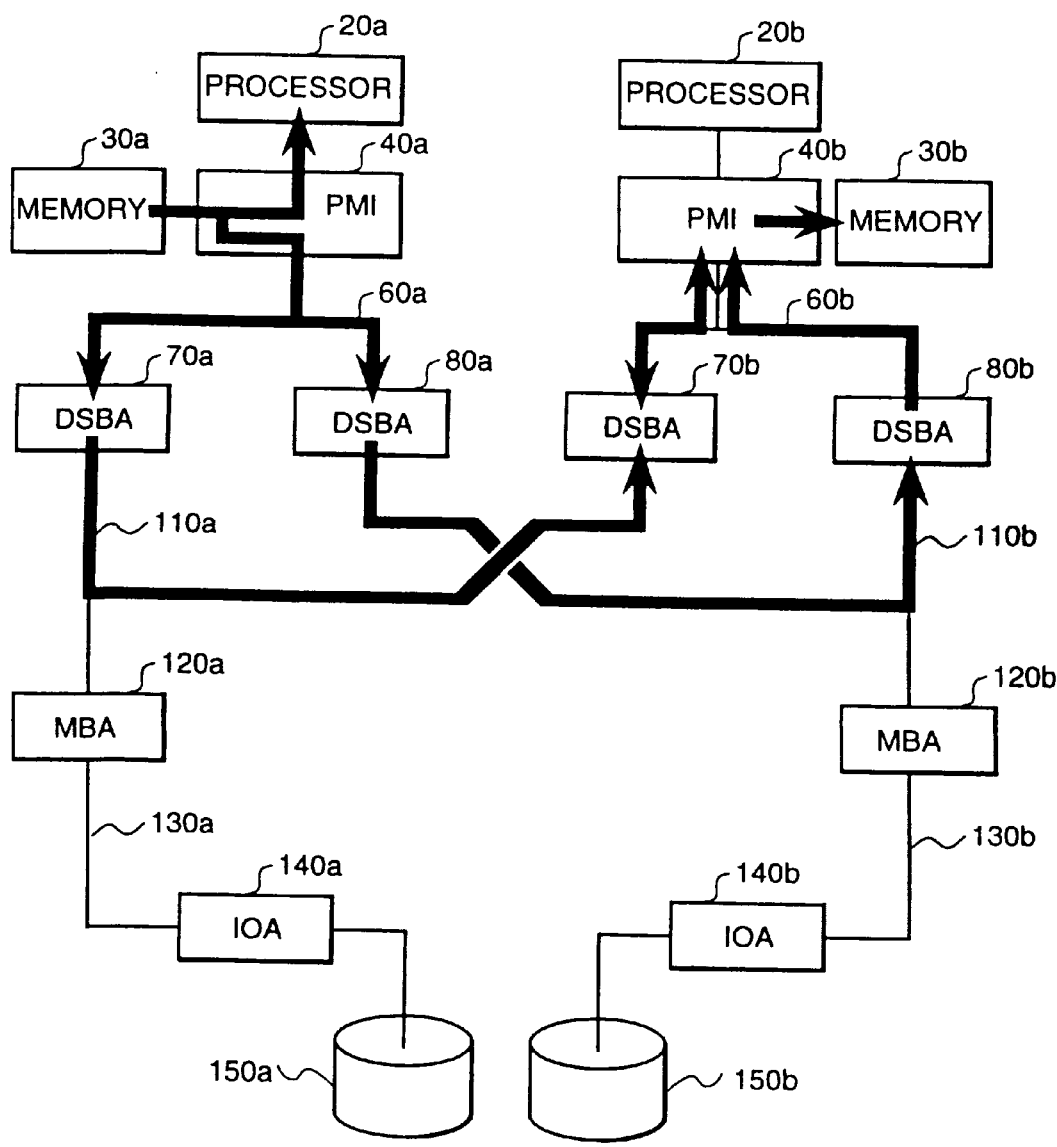
FIG. 9 is a diagrammatic view illustrating a further operation of the duplicated computer system of FIG. 1 where the processor-memory interface of FIG. 2 is employed.

FIG. 9 illustrates copy transfer of contents of the memory 30a read out by a processor in the processor group 20a designated by the copy processor register 449a.

The PMI 40a transmits a copy of contents of the memory 30a read out by the processor designated by the copy processor register 449a to the DSBA 70a or the DSBA 80a via the system bus 60a. The DSBA 70a or the DSBA 80a transmits the received copy to the DSBA 70b or the DSBA 80b via the duplicated bus 110a or the duplicated bus 110b. The DSBA 70b or the DSBA 80b transmits the received copy to the PMI 40b via the system bus 60b. The PMI 40b writes the received copy into the memory 30b.

Figure 10:
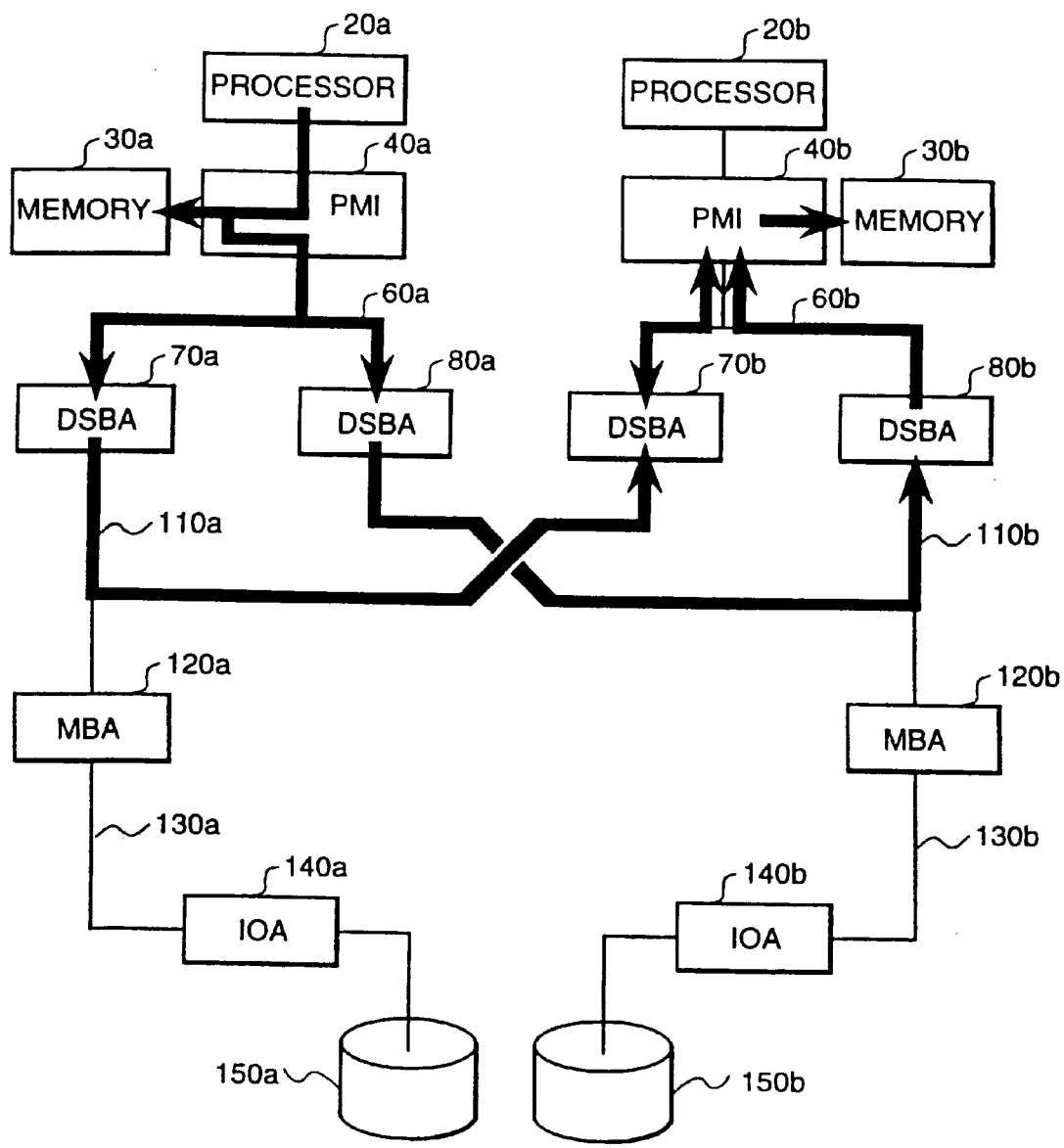
FIG. 10 is a similar view but illustrating a still further operation of the duplicated computer system of FIG. 1.

FIG. 10 illustrates copy transfer of a write access from the processor group 20a to the memory 30a.

The PMI 40a transmits a copy of a write access from the processor group 20a to the memory 30a to the DSBA 70a or the DSBA 80a via the system bus 60a. The DSBA 70a or the DSBA 80b transmits the received copy to the DSBA 70b or the DSBA 80b via the duplicated bus 110a or the duplicated bus 110b. The DSBA 70b or the DSBA 80b transmits the received copy to the PMI 40b via the system bus 60b. The PMI 40b writes the received copy into the memory 30b.

Figure 11:
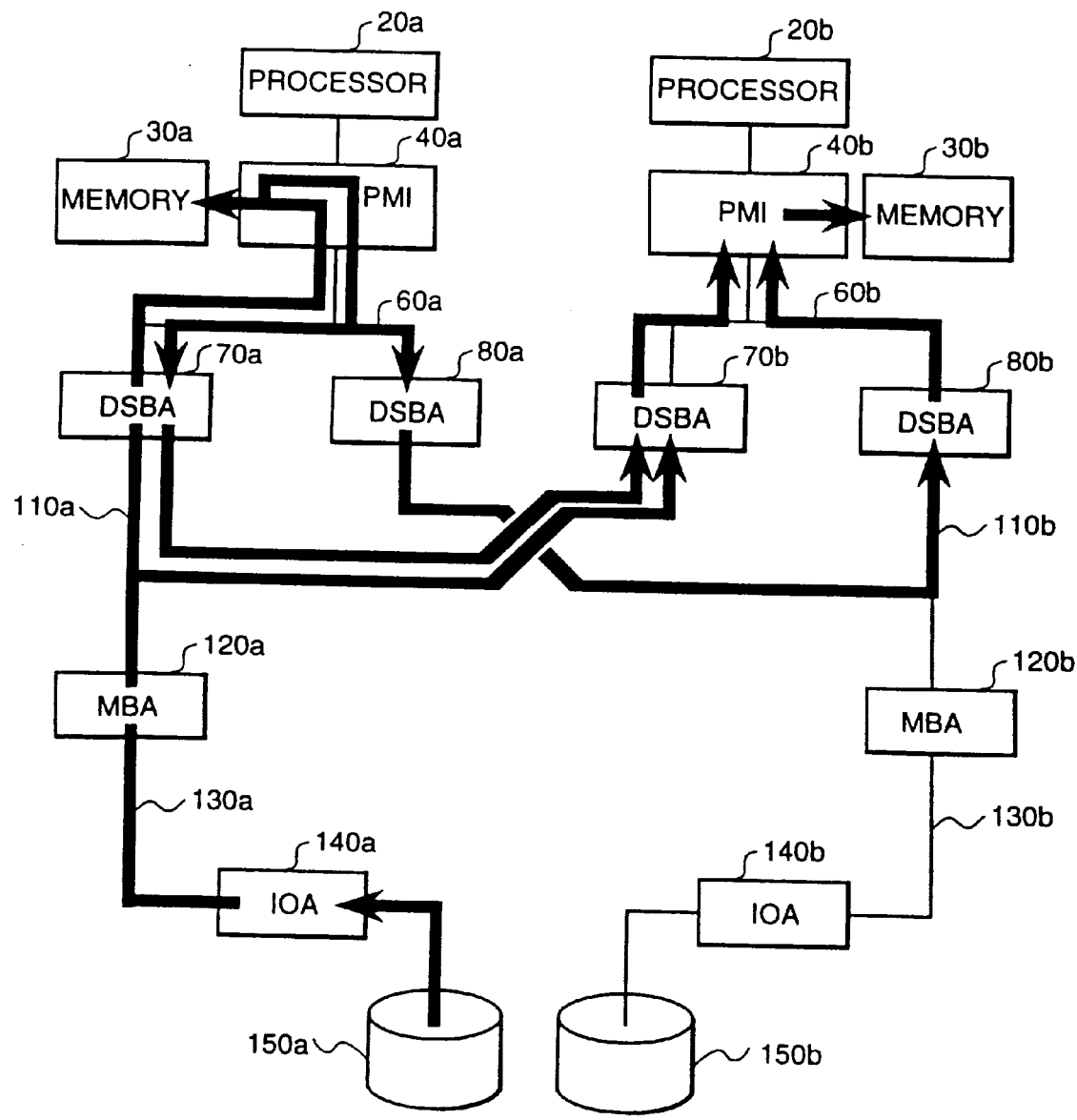
FIG. 11 is a similar view but illustrating a yet further operation of the duplicated computer system of FIG. 1 where the processor-memory interface of FIG. 2 is employed.

FIG. 11 illustrates copy transfer of a DMA write access from the peripheral equipment 150a to the memory 30a.

If DMA write accessing is executed during execution of memory copying, then the memory coincidence is sometimes lost. This is because, when DMA write accessing is executed for a certain memory region as illustrated in FIG. 6, if the memory copy control circuit 440a reads out the same memory region and transfers a copy of the memory region to the memory 30b immediately before data are written into the memory 30a and the memory 30b by the DMA write accessing, then the memory region updated by the DMA writing is written back into the state prior to the updating by the copying from the memory 30a, resulting in incoincidence between the regions of the memory 30a and the memory 30b. Accordingly, copy transfer of DMA write accessing is executed in the following manner by the memory copy control circuit 440a to establish coincidence of the memories.

The IOA 140a transmits data read out from the peripheral equipment 150a to the MBA 120a via the I/O bus 130a, and the MBA 120a outputs the received data to the duplicated bus 110a. The DSBA 70a receives the data outputted to the duplicated bus 110a while the DSBA 70b does not receive the data outputted to the duplicated bus 110a. The DSBA 70a transmits the received data to the PMI 40a via the system bus 60a. The PMI 40a writes the received data into the memory 30a and transmits a copy of the write access to the DSBA 70a or the DSBA 80a via the system bus 60a. The DSBA 70a or the DSBA 80a transmits the received copy to the DSBA 70b or the DSBA 80b via the duplicated bus 110a or the duplicated bus 110b. The DSBA 70b or the DSBA 80b transmits the received copy to the PMI 40b via the system bus 60b. The PMI 40b writes the received copy into the memory 30b.

Figure 12:
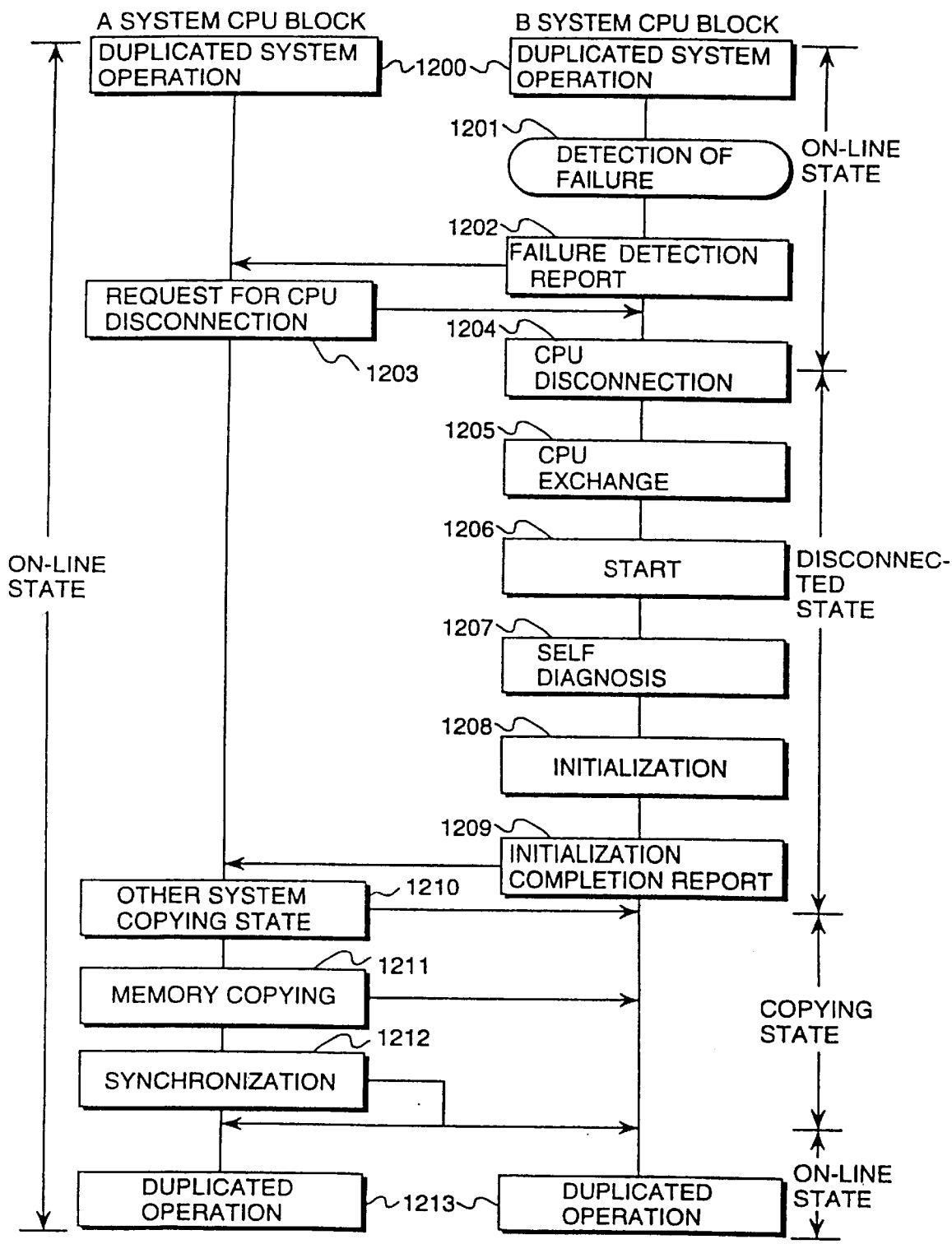
FIG. 12 is a sequential diagram illustrating a fault recovering operation of the duplicated computer system of FIG. 1.

FIG. 12 is a flow chart illustrating a fault recovering operation by execution of a fault recovery processing program when a failure occurs with the B system CPU block 10b.

In FIG. 12, operation of the A system CPU block 10a is illustrated on the left side and operation of the B system CPU block 10b is illustrated on the right side. In the beginning, both of the two system CPU blocks are in an on-line state and are operating in synchronism with each other (step 1,200).

If occurrence of a failure in the B system CPU block 10b is detected (step 1,201), then the B system CPU block 10b reports the failure detection to the A system CPU block 10a by means of the PXI 50b (step 1,202). In response to the failure detection report, the A system CPU block 10a requests the PXI 50b of the B system CPU block 10b for disconnection (step 1,203). The PXI 50b sets the state register 55b to a disconnection state when a failure is detected with the B system CPU 10b and the disconnection request is received from the A system CPU block 10a. After the disconnection state is entered, the DSBA 70b and the DSBA 80b inhibit communication of the duplicated buses 110a and 110b. Consequently, the B system CPU block 10b is disconnected from the duplicated computer system (step 1,204), and the A system CPU block 10a thereafter continues its processing solely. At this point of time, the duplicated system operation is disabled.

A user who performs maintenance and management of the system performs a work of exchanging the failed element of the B system CPU block 10b such as, for example, a failed processor or memory for another device which has the same function and operates normally (step 1,205). After the work is completed, the B system CPU block 10b is started by a manual operation of the terminal equipment 180 or the like (step 1,206).

It is to be noted that the B system CPU block 10b may be started by a manual operation of the terminal equipment 180 or a program for executing processing corresponding to a starting operation may be executed in response to a manual operation of a starter switch which may be provided for the B system CPU block 10b.

If the starting operation is performed, then the 18 system CPU block 10b executes a self diagnosis program built in the ROM 35b to check whether or not the B system CPU block 10b is normal (step 1,207), and then executes an initialization program to initialize the cache group 22b and the memory 30b (step 1,208), whereafter it reports completion of the initialization to the A system CPU block 10a (step 1,209).

In response to the initialization completion report, the A system CPU block 10a sets the B system CPU block 10b to a copying state (step 1,210) and performs memory copying (step 1,211). Then, after the memory copying is completed, the A system CPU block 10a performs synchronization of the two system CPU blocks (step 1,212). This synchronization may be effected by simultaneous resetting of the two system CPU blocks or may be effected by responses (sent back simultaneously from the two system CPU blocks) when the two system CPU blocks read access a certain I/O register of the A system peripheral equipment block 100a or the B system peripheral equipment block 100b or else by transmitting timing signals for synchronization to each other.

After the synchronization of the two system CPU blocks is completed, the A system CPU block 10a sets the B system CPU block 10b to an on-line state to resume a duplicated system operation (step 1,213).

Figure 13:
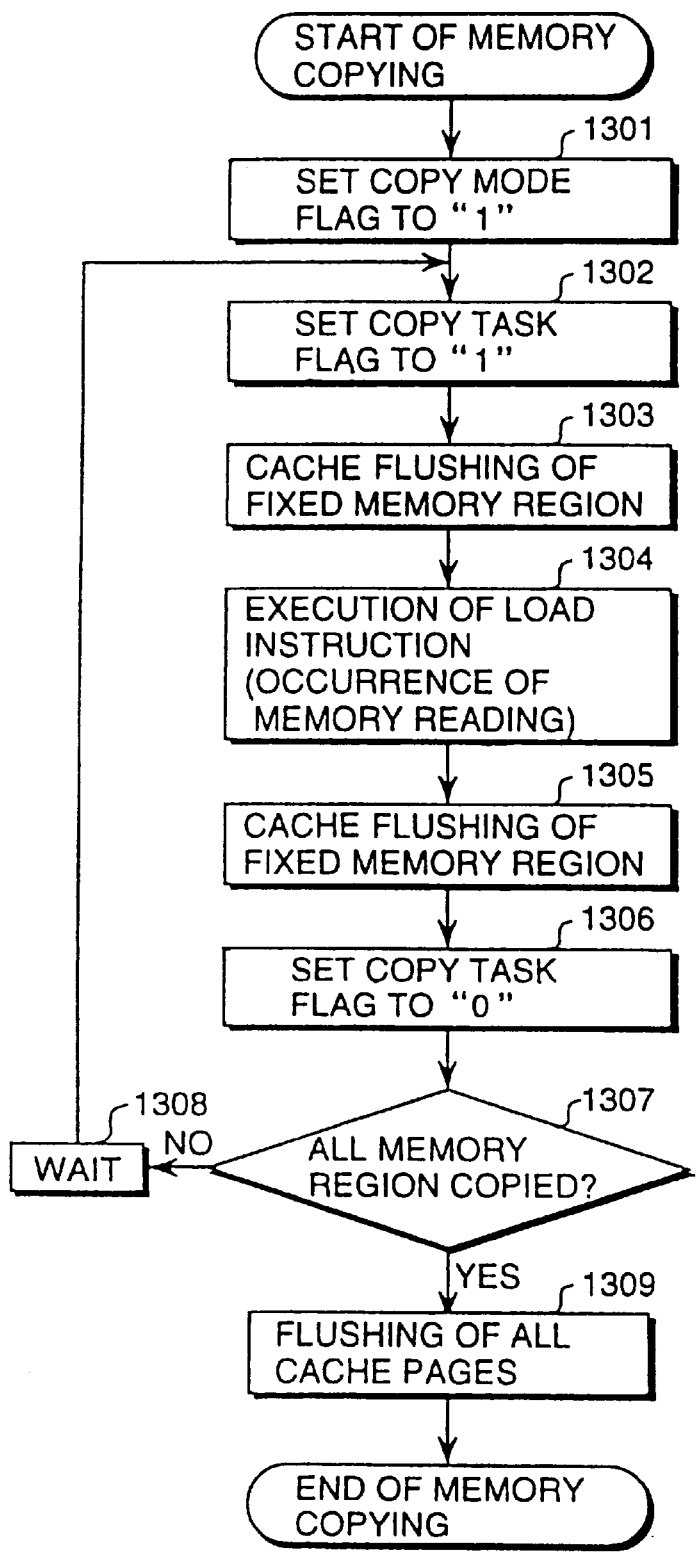
FIG. 13 is a flow chart illustrating details of a memory copying operation of the duplicated computer system of FIG. 1 where the processor-memory interface of FIG. 2 is employed.

FIG. 13 is a flow chart illustrating contents of operation of memory copying. A sequence of steps of operation for memory copying is performed by a designated one processor in the processor groups of the CPU block which is in an on-line state.

First, the designated processor sets t he copy mode flag 444a to 1 (step 1,301).

Then, the designated processor sets the copy task flag 448a to 1 (step 1,302).

Then, the designated processor flushes the caches in a fixed memory region (step 1,303). This is performed in order to have memory read accessing performed by the processor with certainty.

Thereafter, the designated processor executes a load instruction to the caches in the memory region for which flushing has been executed (step 1,304). The memory region was cache flushed in step 1,303, and consequently, if the load instruction is executed, then a cache miss occurs and memory reading is executed. Stored contents of the memory read out by the memory reading are copied by the memory copy control circuit 440a and transferred to a memory of the other system.

Subsequently, the designated processor executes cache flushing again to the memory region for which the load instruction has been executed (step 1,305). This is performed in order to recover the cache consistency of the memory region for which the load instruction has been performed independently of ordinary operation processing.

It is to be noted that the steps 1,303, 1,304 and 1,305 may be performed in units of a memory region of, for example, 4 kilobytes or in units of a memory space of a memory region having an equal size to that of a cache line.

Subsequently, the designated processor sets the copy task flag 448a to 0 (step 1,306).

Then, the designated processor discriminates whether or not all of the memory regions have been copied (step 1,307). If all of the memory regions have not been copied, then in order to minimize an influence on ordinary operation processing, a predetermined interval of time is placed (step 1,308), and then the operations in steps 1,302 through 1,306 are executed for a next address region. If all of the memory regions have been copied, then all caches of the processor group are flushed and data present only in the caches are copied to establish the coincidence of all of the memory regions including the caches (step 1,309). The memory copying is completed thereby.

While, in the foregoing description, reading out of stored contents of the memory 30a is performed by one of the processors of the processor group 20a in order to copy all of the stored contents of the memory 30a and a DMA write access is normally copied in order to assure the data coincidence in memory copying, as another form, it should be noted that reading out of the stored contents of the memory 30a is performed by a memory copy control circuit for exclusive use provided in the processor-memory interface 40a to reduce the burden to the processors, or only a DMA write access which is determined to have the possibility that it may cause a loss of data coincidence is copied from among DMA write accesses generated during memory copying to reduce the burden to a duplicated bus which serves as a transfer path for copy data or DMAs.

Second Embodiment

In particular, as a second embodiment, a form wherein reading out of stored contends of the memory 30a is performed by a memory copy control circuit for exclusive use provided in the processor-memory interface 40a and any DMA write access is normally copied, another form wherein reading out of stored contents of the memory 30a is performed by a processor and only any DMA write access which is determined to have the possibility that it may cause loss of data coincidence is copied or a further form wherein reading out of stored contents of the memory 30a is performed by a memory copy control circuit for exclusive use provided in the processor-memory interface 40a and only any DMA write access which is determined to have the possibility that it may cause loss of data coincidence is copied, is possible. Here, while, for the convenience of description, the form wherein reading out of stored contents of the memory 30a is performed by a memory copy control circuit for exclusive use provided in the processor-memory interface 40a and only any DMA write access which is determined to have the possibility that it may cause loss of data coincidence is described as the second embodiment, the form wherein reading out of stored contends of the memory 30a is performed by a memory copy control circuit for exclusive use provided in the processor-memory interface 40a and a DMA write access is normally copied or the form wherein reading out of stored contents of the memory 30a is performed by a processor and only any DMA write access which is determined to have the possibility that it may cause loss of data coincidence is copied can be realized readily from the first embodiment described hereinabove and the second embodiment described below.

In the following, the second embodiment of the present invention will be described with reference to FIGS. 14, 15, 16 and 17. It is to be noted that a duplicated computer system, DSBAs, a synchronizing operation of an A system CPU block and a B system CPU block and a fault recovering operation are similar to those of the first embodiment, and FIGS. 1, 4, 5, 6, 7, 8, 10 and 12 are applied also to the second embodiment.

Figure 14:
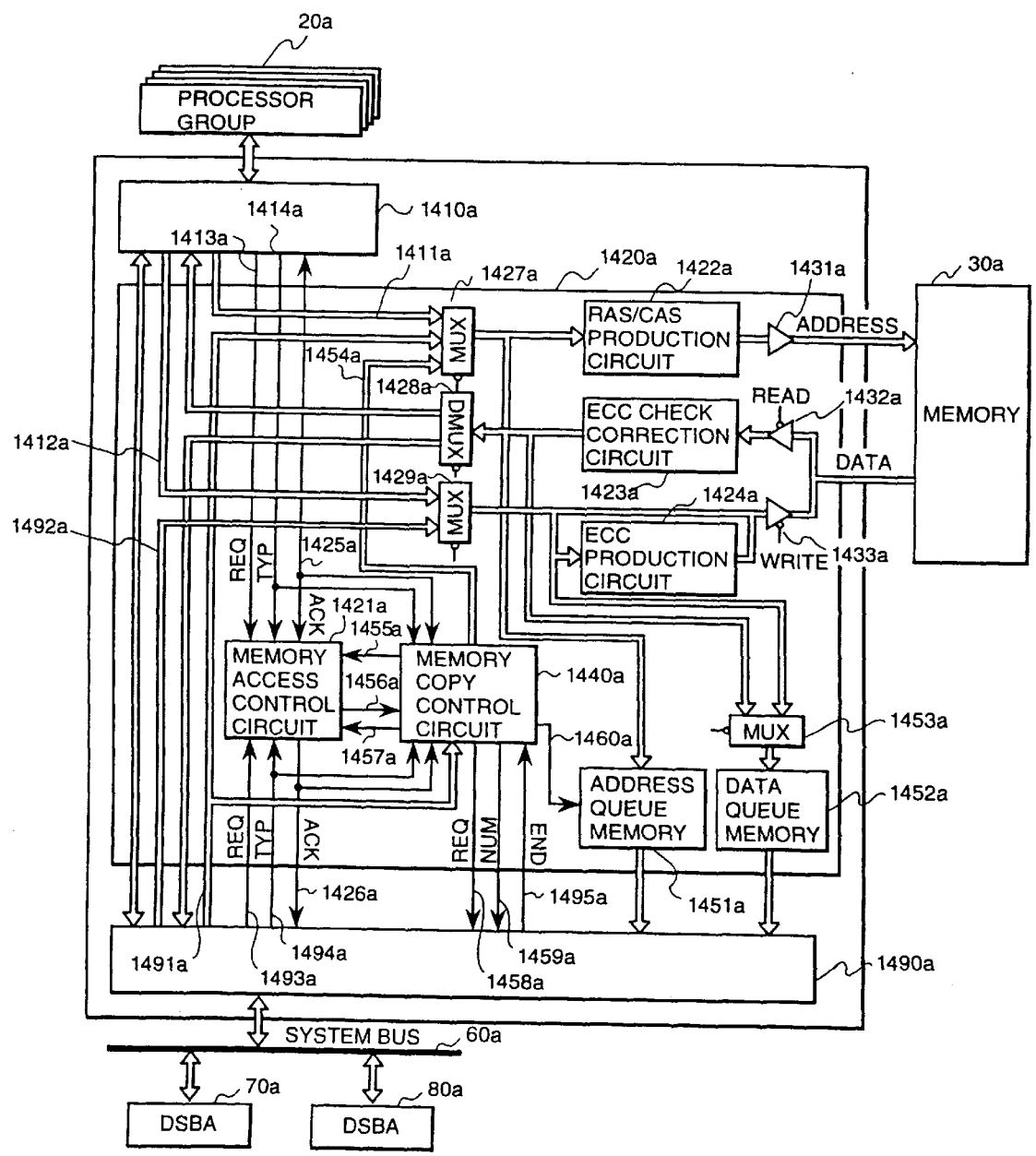
FIG. 14 is a block diagram of another processor-memory interface of the duplicated computer system of FIG. 1 showing a second preferred embodiment of the present invention.

FIG. 14 shows a construction of the PMI 40a in the second embodiment. The PMI 40a includes a processor interface 1410a for communicating data with the processor group 20a, a memory interface 1420a for reading out of and writing into the memory 30a, a system bus interface 1490a for communicating data with the DSBAs 70a and 80a via the system bus 60a, and various logical operation devices.

The processor interface 1410a requests the memory interface 1420a for memory accessing in response to a memory access from the processor group 20a, and the system bus interface 1490a requests the memory interface 1420a for memory accessing in response to a memory access from the DSBA 70a or the DSBA 80a. The memory interface 1420a arbitrates memory access requests from the processor interface 1410a and the system bus interface 1490a to execute desired memory accessing. The maximum data length accessed by a single memory accessing operation is equal to the data line length of the cache group 22a. A data line includes data of a plurality of bytes and is allocated to successive address regions. It is to be noted that a memory access from the DSBA 70a or the DSBA 80a is produced by data transfer from the peripheral equipment 150a or 150b, that is, so-called DMA (Dynamic Memory Access). Further, the processor interface 1410a requests the system bus interface 1490a for PIO accessing in response to a read or write access by the processor group 20a to any of various registers provided in the components connected to the system bus 60a, that is, so-called PIO (Peripheral Input/Output) access. The system bus interface 1490a executes desired PIO accessing to any of the registers of the components connected to the system bus 60a in response to the PIO access request.

A detailed construction of the memory interface 1420a will be described. The memory interface 1420a includes a memory access control circuit 1421a, an RAS/CAS production circuit 1422a for producing a row address and a column address of the memory 30a, an ECC check correction circuit 1423a for detecting and correcting a bit error of read data read out from the memory 30a using an ECC (Error Correction Code), an ECC production circuit 1424a for producing an ECC for write data to be written into the memory 30a, and various logical operation devices. Subsequently, a basic operation of the memory interface 1420a will be described.

If the processor interface 1410a outputs a memory access request signal 1413a and an access type code signal 1414a representative of read/write and a data length to the memory access control circuit 1421a and the system bus interface 1490a similarly outputs a memory access request signal 1493a and an access type code signal 1494a to the memory access control circuit 1421a, then the memory access control circuit 1421a refers to those signals, and selects one of the memory accesses from the processor interface 1410a and the system bus interface 1490a based on a preferential order set in advance and outputs an access acceptance signal 1425a or 1426a to an interface which is an access source of the selected memory access. Further, the memory access control circuit 1421a changes over a multiplexer 1427a so that a selected one of a memory access address 1411a outputted from the processor interface 1410a, a memory access address 1491a outputted from system bus interface 1490a and a memory copy address 1454a outputted from a memory copy control circuit 1440a is transmitted to the RAS/CAS production circuit 1422a, and a row address and a column address produced by the RAS/CAS production circuit 1422a are transmitted to the memory 30a via a buffer 1431a.

Further, the memory access control circuit 1421a changes over, if the selected memory access is a write access, a multiplexer 1429a so that a selected one of memory write data 1412a and 1492a outputted from the processor interface 1410a and the system bus interface 1490a is transmitted to the memory via a buffer 1433a together with an ECC produced by the ECC production circuit 1424a. On the other hand, if the selected memory access is a read access, then read data read out from the memory 30a via a buffer 1432a are transmitted to the ECC check correction circuit 1423a, and then a demultiplexer 1428a is changed over so that read data after ECC checking and correction have been performed are transmitted to a selected one of the processor interface 1410a and the system bus interface 1490a.

Subsequently, components for memory copying will be described.

The memory interface 1420a further includes, in order to perform so-called memory copying wherein data stored in the memory 30a are copied to the memory 30b of the B system CPU block 10b to make the memory 30b coincide with the memory 30a, an address queue memory 1451a for storing an access address selected by the multiplexer 1427a, a data queue memory 1452a for storing write data selected by the multiplexer 1429a and read data outputted from the ECC check correction circuit 1423a, a multiplexer 1453a for selecting write data and read data to be stored into the data queue memory 1452a, and a memory copy control circuit 1440a for reading out the memory 30a and controlling the address queue memory 1451a and the data queue memory 1452a. It is to be noted that, since the A system CPU block 10a executes memory copying in parallel to ordinary processing, in order to maintain the coincidence between the memory 30a and the memory 30b which always varies by ordinary processing during memory copying, not only data stored in the memory 30a are copied, but also write data to be written into the memory 30a are copied.

Figure 15:
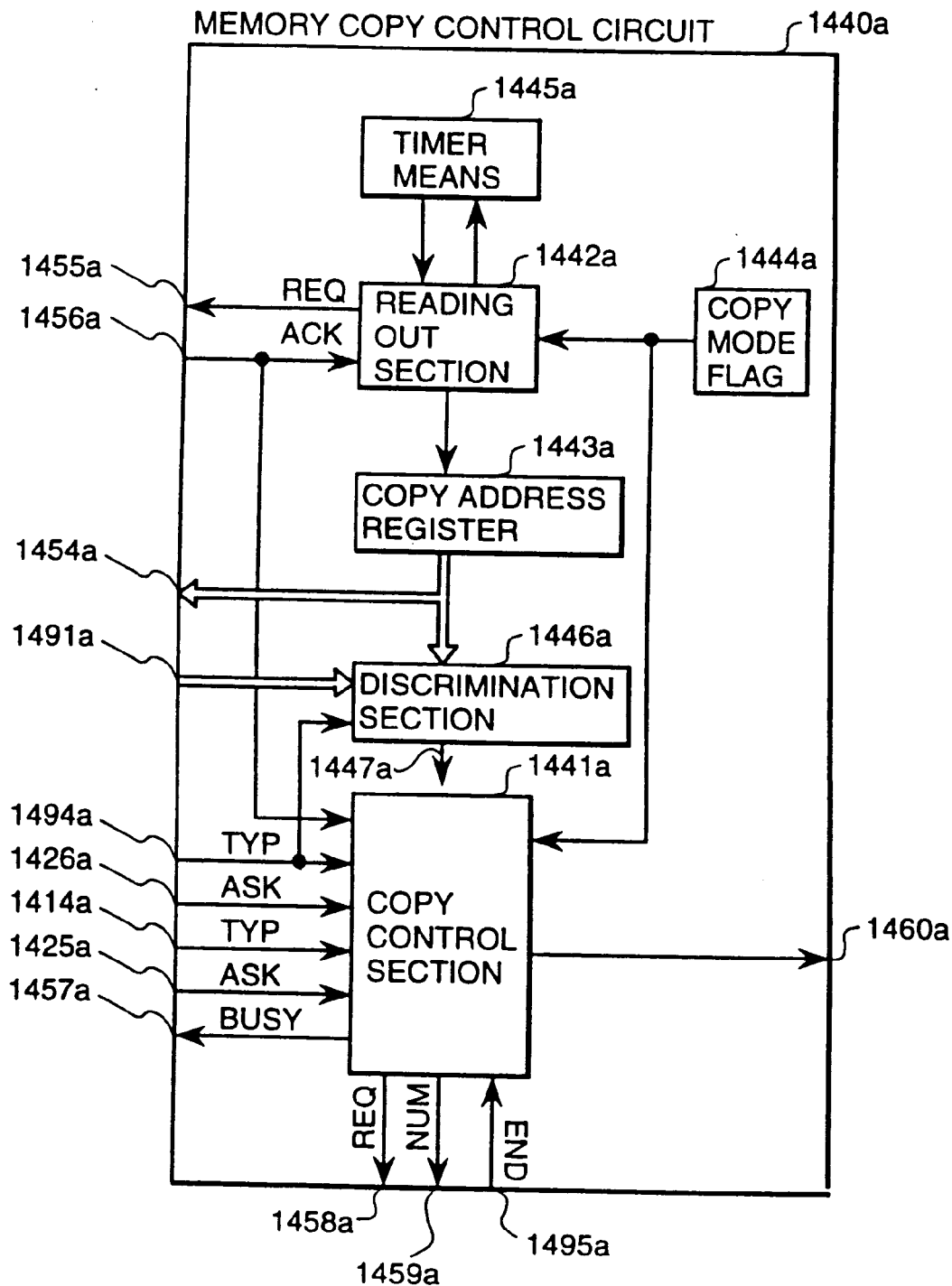
FIG. 15 is a block diagram of a memory copy control circuit of the processor-memory interface of FIG. 14.

FIG. 15 is a block diagram of the memory copy control circuit 1440*a* in the second embodiment. The memory copy control circuit 1440*a* includes a copy mode flag 1444*a* for being used as a trigger to execution of memory copying, a copy address register 1443*a* for indicting an address to be read out from the memory 30*a* in order to copy data stored in the memory 30*a*, a reading out section 1442*a* for producing a read access to the address indicated by the copy address register 1443*a*, timer means 1445*a* for determining an interval of time after which a read access is to be produced by the reading out section 1442*a*, a discrimination section 1446*a* for discriminating that an abnormal overlap is produced by copying in the memory 30*b*, and a copy control section 1441*a* for controlling the address queue memory 1451*a* and the data queue memory 1452*a*.

The copy mode flag 1444*a* and the copy address register 1443*a* can be written/read out by the processor group 20*a*. Further, the copy address register 1443*a* is outputted as the memory copy address 1454*a* to the multiplexer 1427*a*.

When the copy mode flag 1444*a* is set to 1 and a value other than 0 is placed in the copy address register 1443*a*, the reading out section 1442*a* outputs a memory access request signal 1455*a* to the memory access control circuit 1421*a*. The memory access control circuit 1421*a* selects one of memory accesses from the processor interface 1410*a*, the system bus interface 1490*a* and the reading out section 1442*a* in accordance with a preferential order set in advance. If the memory access from the reading out section 1442*a* is selected, then the memory access control circuit 1421*a* outputs an access acceptance signal 1456*a* to the reading out section 1442*a* and changes over the multiplexer 1427*a* so that a memory copy address 1454*a* which is a value of the copy address register 1443*a* is transmitted to the RAS/CAS production circuit 1422*a* to execute memory read accessing. The read data length in this instance is one line.

The reading out section 1442*a* decrements, in response to the access acceptance signal 1456*a*, the value of the copy address register 1443*a* by one line and sets it as an address of a line to be read out subsequently, and then starts the timer means 1445*a*. The timer means 1445*a* has a function of measuring the time and notifies the reading out section 1442*a* of an end of waiting when a waiting time set in advance elapses since the time of starting. Setting of the waiting time may be performed by a writing operation into a register provided in the timer means 1445*a*.

In response to the waiting end notification from the timer means 1445*a*, the reading out section 1442*a* outputs a memory access request signal 1455*a* to the memory access control circuit 1421*a* again.

The operation described above is repetitively executed until the copy mode flag 1444*a* is set to 0 or the value of the copy address register 1443*a* becomes equal to 0. It is to be noted that the preferential order number of a memory access by the reading out section 1442*a* should preferably be set to the lowest order number so that memory accessing by the processor group 20*a* which is performing ordinary processing may not be obstructed.

The discrimination section 1446*a* refers to the value of the copy address register 1443*a*, the value of the memory access address 1491*a* from the system bus interface 1490*a* and an access type code signal 1494*a* from the system bus interface 1490*a*, and if the access type code signal 1494*a* indicates memory write and the value of the memory access address 1491*a* is higher than the value of the copy address register 1443*a* but lower than the value of the copy address register 1443*a* + a constant, then it is determined that a copy of the memory 30*a* prior to updating by DMA writing is written into a memory region of the memory 30*b* which has been updated by the same DMA writing and incoincidence between the memory 30*a* and the memory 30*b* results, and the discrimination section 1446*a* outputs a DMA write copy request siqnal 1447*a* to the copy control section 1441*a* in order to request for memory accessing from the system bus interface 1490*a*, that is, for copying of DMA write. It is to be noted that the value of the constant mentioned above is preferably set by a writing operation into a register provided in the discrimination section 1446. The value of the constant will be hereinafter described.

The copy control section 1441*a* refers to the copy mode flag 1444*a*, the access type code signals 1414*a*, 1494*a* and the access acceptance signal 1425*a*, 1426*a* and 1456*a*, and if the copy mode flag 1444*a* is set to 1, then the copy control section 1441*a* stores a write address outputted from the multiplexer 1427*a* and write data outputted from the multiplexer 1429*a* into the address queue memory 1451*a* and the data queue memory 1452*a*, respectively, in response to an access acceptance signal 1425*a* responding to the memory write request from the processor interface 1410*a*. The copy control section 1441*a* further stores, in response to another access acceptance signal 1456*a*, a read address outputted from the multiplexer 1427*a* and read data outputted from the ECC check correction circuit 1423*a* into the address queue memory 1451*a* and the data queue memory 1452*a*, respectively. Furthermore, if the discrimination section 1446*a* outputs a DMA write copy request signal 1447*a*, the copy control section 1441*a* stores a write address outputted from the multiplexer 1427*a* and write data outputted from the multiplexer 1429*a* into the address queue memory 1451*a* and the data queue memory 1452*a*, respectively, in response to an access acceptance signal 1426*a* responding to the memory write signal from the system bus interface 1490*a*. The locations for storing the address queue memory 1451*a* and the data queue memory 1452*a* are defined by a pointer 1460*a*.

The copy control section 1441*a* further outputs, after memory access addresses and data are stored into the address queue memory 1451*a* and the data queue memory 1452*a*, respectively, a copy transmission request signal 1458*a* and a pointer 1459*a* representative of a position into which an address and data to be transferred are stored to the system bus interface 1490*a* in order to transfer the memory access addresses and the data in the order in which the memory access addresses and the data were stored. In response to the copy transmission request signal 1458*a*, the system bus interface 1490*a* reads out an address and data indicated by the pointer 1459*a* from the address queue memory 1451*a* and the data queue memory 1452*a*, respectively, adds an identifier indicating that the address and the data are a copy and transmits the address and the data together with the identifier to the system bus 60*a*. This identifier can be realized, for example, by allocating one of patterns of type codes representative of kinds of bus accesses in the system bus 60*a*. After copy transmission to the system bus 60*a* is completed, the system bus interface 1490*a* outputs a copy transmission end signal 1495*a* to the copy control section 1441*a*. Upon reception of the copy transmission end signal 1495*a*, the copy control section 1441*a* requests the system bus interface 1490*a* for next copy transmission.

Further, if the address queue memory 1451*a* and the data queue memory 1452*a* become full, the copy control section 1441*a* outputs a BUSY signal 1457*a* to the memory access control circuit 1421*a*, and in response to the BUSY signal 1457*a*, the memory access control circuit 1421*a* inhibits memory accessing which requires copying. For example, while the BUSY signal 1457a is outputted, a read access by the reading out section 1442a, a write access by a processor and a write access by DMA are rejected. This prevents a miss of memory copying.

Subsequently, copy transfer when the A system CPU block 10a is in an on-line state and the B system CPU block 10b is in a copying state, that is, when memory copying from the memory 30a to the memory 30b is proceeding, will be described with reference to FIGS. 1, 16 and 17. When the A system CPU block 10a is in an on-line state and the B system CPU block 10b is in a copying state, the DSBAs 70a and 80a are set to the primary mode and the DSBAs 70b and 80b are set to the secondary mode. Further, the copy transfer registers of the DSBAs 70a and 80a are set in such a manner as illustrated in FIG. 8 similarly as in the first embodiment. Consequently, a copy whose address is an even number is transferred via the duplicated bus 110a by the DSBA 70a whereas a copy whose address is an odd number is transferred via the duplicated bus 110b by the DSBA 80a.

Figure 16:
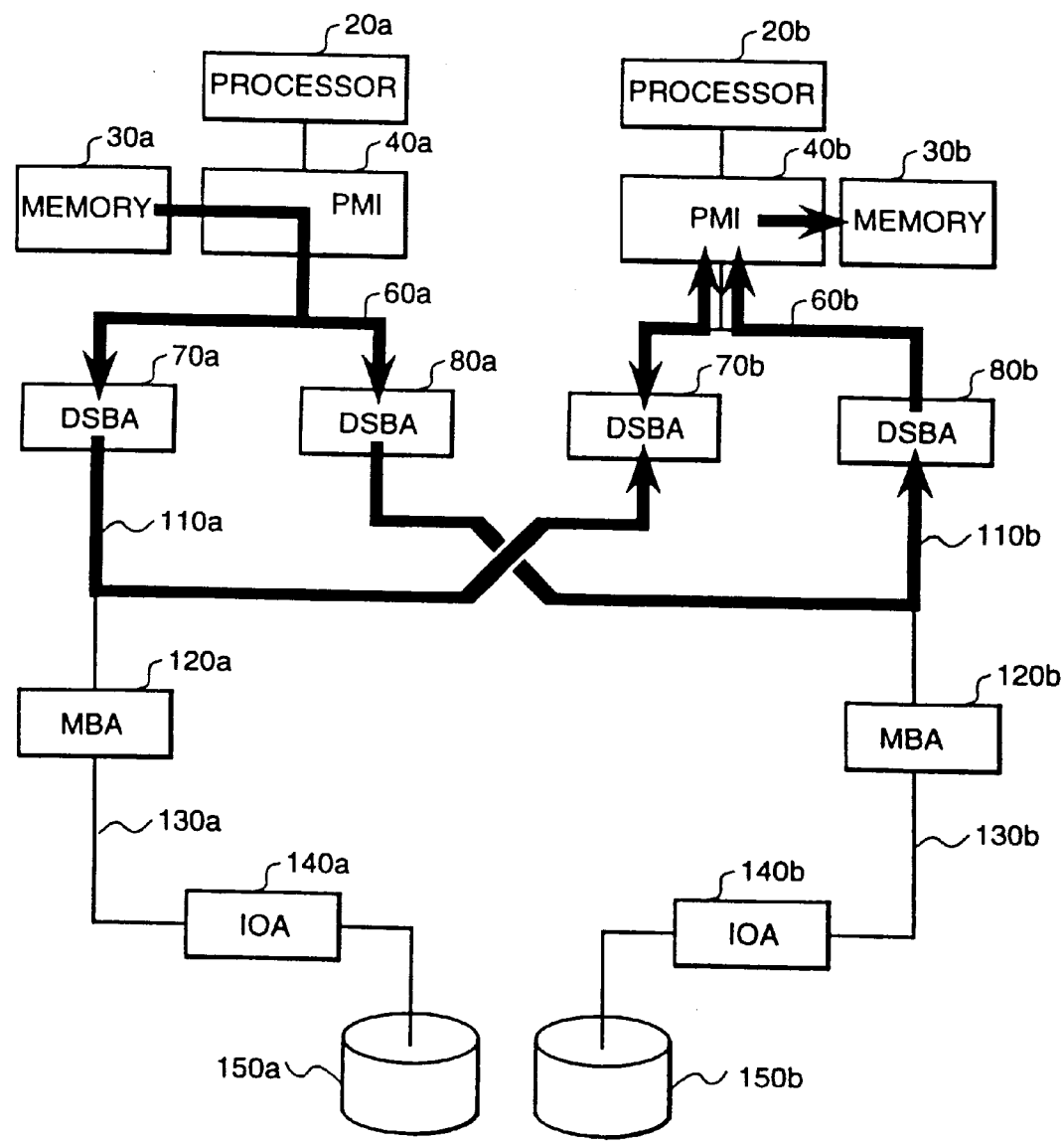
FIG. 16 is a block diagram illustrating an operation of the duplicated computer system of FIG. 1 where the processor-memory interface of FIG. 14 is employed.

FIG. 16 illustrates copy transfer of contents of the memory 30a read out by the memory copy control circuit 1440a of the PMI 40a.

The PMI 40a transmits a copy of contents of the memory 30a read out by the memory copy control circuit 1440a to the DSBA 70a or the DSBA 80a via the system bus 60a. The DSBA 70a or the DSBA 80a transmits the received copy to the DSBA 70b or the DSBA 80b via the duplicated bus 110a or the duplicated bus 110b. The DSBA 70b or the DSBA 80b transmits the received copy to the PMI 40b via the system bus 60b. The PMI 40b writes the received copy into the memory 30b.

Figure 17:
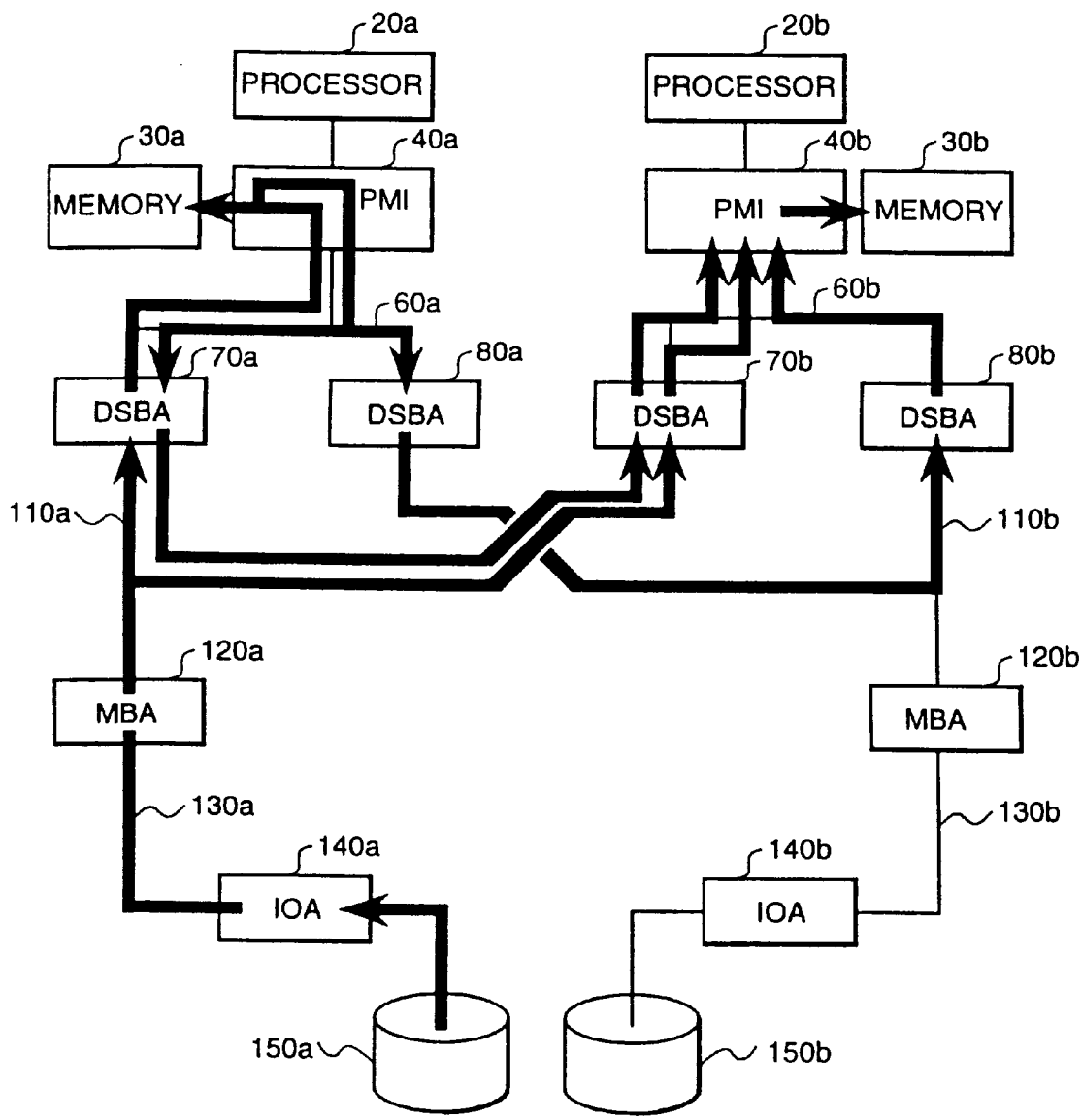
FIG. 17 is a similar view but illustrating another operation of the duplicated computer system of FIG. 1 where the processor-memory interface of FIG. 14 is employed.

FIG. 17 illustrates copy transfer of a DMA write access from the peripheral equipment 150a to the memory 30a.

If DMA write accessing is executed during execution of memory copying, then the memory coincidence is sometimes lost. This is because, when DMA write accessing is executed for a certain memory region as illustrated in FIG. 6, if the memory copy control circuit 1440a reads out the same memory region and transfers a copy of the memory region to the memory 30b immediately before data are written into the memory 30a and the memory 30b by the DMA write accessing, then the memory region updated by the DMA writing is written back into the state prior to the updating by the copying from the memory 30a, resulting in incoincidence between the regions of the memory 30a and the memory 30b. Accordingly, when it is determined by the discrimination section 1446a of the memory copy control circuit 1440a that memory incoincidence mentioned hereinabove occurs, copy transfer of DMA write accessing is executed in such a manner as described below to establish coincidence of the memories. It is to be noted that the value of the constant of the discrimination section 1446a is determined in the following manner. In particular, the value of the constant of the discrimination section 1446a is set to a value equal to or higher than a maximum line number of one of copies of the memory 30a read out by the memory copy control circuit 1440a which has not been written into the memory 30b as yet at an arbitrary point of time, that is, to a value equal to or higher than a maximum line number of copies present in the copy queue memories of the PMI or the DSBA and a copy being transmitted to a system bus or a duplicated bus. While this value depends upon the configuration of the system, the constant should preferably be set as low as possible.

The IOA 140a transmits data read out from the peripheral equipment 150a to the MBA 120a via the I/O bus 130a, and the MBA 120a outputs the received data to the duplicated bus 110a. The DSBA 70a receives the data outputted to the duplicated bus 110a while the DSBA 70b does not receive the data outputted to the duplicated bus 110a. The DSBA 70a transmits the received data to the PMI 40a via the system bus 60a. The PMI 40a writes the received data into the memory 30a and transmits a copy of the write access to the DSBA 70a or the DSBA 80a via the system bus 60a. The DSBA 70a or the DSBA 80a transmits the received copy to the DSBA 70b or the DSBA 80b via the duplicated bus 110a or the duplicated bus 110b. The DSBA 70b or the DSBA 80b transmits the received copy to the PMI 40b via the system bus 60b. The PMI 40b writes the received copy into the memory 30b. It is to be noted that copy transfer of the DMA write access is performed only when it is determined by the discrimination section 1446a of the memory copy control circuit 1440a that it is needed to copy the DMA write access, but in any other DMA write access, the copy transfer is executed in such a manner as illustrated in FIG. 6.

Copy transfer from the processor group 20a to the memory 30a in the second embodiment is performed by the operation described above with reference to FIG. 10 similarly as in the first embodiment.

Figure 18:
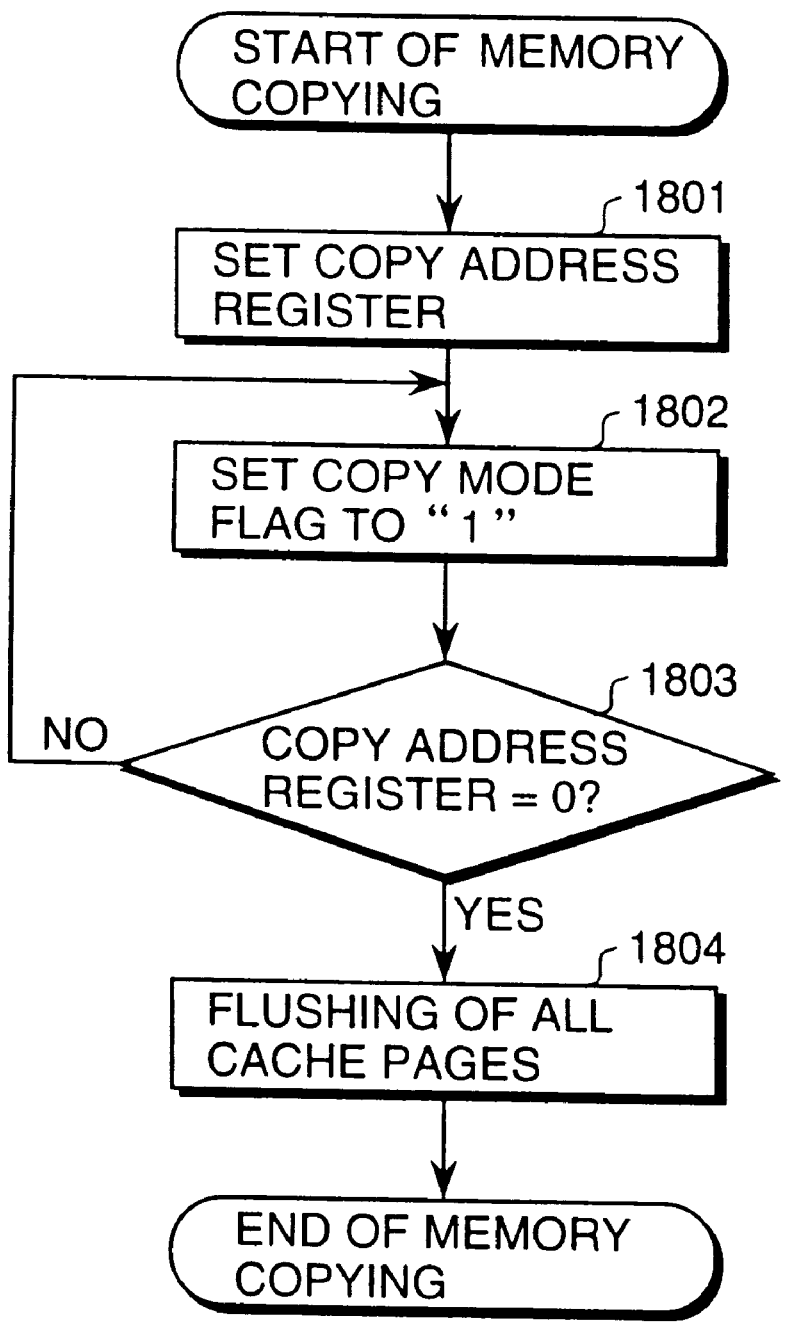
FIG. 18 is a flow chart illustrating details of a memory copying operation of the duplicated computer system of FIG. 1 where the processor-memory interface of FIG. 14 is employed.

A flow chart illustrating contents of operation of memory copying in the second embodiment is shown in FIG. 18. Setting/reading out operations for various registers are performed by a designated one of processors of the processor group of the CPU block which is in an on-line state.

First, the designated processor sets a last address of a memory region to the copy address register 1443a (step 1,801).

Then, the copy mode flag 1444a is set to 1 (step 1,802). Thereupon, reading out of memory contents by the address queue memory 1451a and copy transfer of the thus read out memory contents are started. It is to be noted that the copy mode flag 1444a is kept set to 1 until synchronization of the two CPU blocks is completed.

The designated processor periodically reads out the copy address register 1443a and confirms whether or not the value of it is 0 (step 1,803). If the value of the copy address register 1443a is 0, this signifies that copying of the entire memory space has been completed. However, at this point of time, the coincidence with the caches has not been established as yet.

Thus, all of the caches of the processor group are flushed and also data which are present only in the caches are copied to establish coincidence of all of the memory regions including the caches (step 1,804). Memory copying is completed thereby.

It is to be noted that, while, in the foregoing description, such a duplicated computer system as shown in FIG. 1 is described, the present invention can naturally be applied also to triplicated or more multiplexed computer systems.

As described in connection with the first embodiment above, by copying stored data read out from a memory unit by a processor and a copy of write data from the processor or a peripheral equipment to the memory unit in the same order as in the memory accessing into a memory of the other CPU block and flushing all caches after all data stored in the memory are copied, coincidence of the memories of the two system CPU blocks is realized. Consequently, during execution of memory copying, DMA between the peripheral equipment and the memories need not be inhibited different from the prior art.

Further, as described in connection with the second embodiment, by copying only that one of DMA write accesses produced during memory copying which is determined to have the possibility that it may cause loss of data coincidence, a load to a duplicated bus which serves as a transfer route for copy data or a DMA can be reduced.

Further, as described in connection with the second embodiment, if reading out of stored contents of a memory is performed by a memory copy control circuit for exclusive use provided in a possessor/memory interface, then only setting of registers in the beginning is required as pre-processing for memory copying. Consequently, the burden to the processor by pre-processing for memory copying can be reduced.

According to the present invention, in a computer system composed of a plurality of processing units and having a fault resisting function, stored data read out from a memory unit by a processor and copies of write data from the processor and a peripheral equipment or equipments to the memory unit are copied in the same order as that of the memory accesses into a memory or memories of the other CPU block or blocks, and after all data stored in the memory are copied, all caches are flushed thereby to realize coincidence of the memories of the two system CPU blocks. Consequently, during execution of memory copying, DMA between the peripheral equipment or equipments and the memories need not be inhibited different from the prior art. Accordingly, the processing performance during on-line maintenance can be improved comparing with that of the conventional system.

Further, by copying only that one of DMA write accesses produced during memory copying which is determined to have the possibility that it may cause loss of data coincidence, a load to a duplicated bus which serves as a transfer route for copy data or a DMA can be reduced. Consequently, the processing performance during on-line maintenance can be further improved.

Further, if reading out of stored contents of a memory is performed by a memory copy control circuit for exclusive use provided in a possessor/memory interface, then only setting of registers in the beginning is required as pre-processing for memory copying. Consequently, the burden to the processor by pre-processing for memory copying can be reduced, and the processing performance during on-line maintenance can be further improved.

What is claimed is:

1. A multiplexed computer system including a plurality of processing units which carry out the same operation in synchronism with each other, and at least one peripheral unit capable of accessing all of said processing units, each of said processing units including at least one processor which carries out operation processing and a memory unit which is accessible by said at least one processor and said at least one peripheral unit, said plurality of processing units being communicable with each other, wherein each of said processing units includes copying means for transferring stored contents read out from said memory unit in response to readout accesses by said at least one processor and for transferring copies of data to be written into said memory unit in response to write accesses to said memory unit by said at least one processor, or said at least one peripheral unit, in the same order in which the read-out accesses and the write accesses to said memory unit were synchronized to the memory units of the other processing units;

each of said processing units including a copy processor register for designating at least one of said processors which is to execute reading out of said stored contents of its own memory unit in order to effect memory copying, a copy mode flag for indicating that memory copying processing for making said stored contents of its own memory unit coincide with said stored contents of at least one memory unit of at least one other processor, and a copy task flag for indicating that the memory copying processing is proceeding and the processor is reading out the stored contents of said memory unit in order to transfer the stored contents of its own memory unit to said at least one memory unit of said at least one other processing unit; and wherein when said copy mode flag is in a set state, said copying means transfers copies of data to be written into said memory unit by said processor or said peripheral unit in the same order in which data were written into said memory unit of one of the other processing units, and when said copy task flag is in a set state, said copying means transfers the stored contents read out from said memory unit by the read-out accesses from said memory unit by the processor designated by said copy processor register and copies of said data to be written into said memory unit by the write accesses to said memory unit by said processor or said at least one peripheral unit in the same order in which the read-out accesses and the write accesses to said memory unit were synchronized with the memory units of the other processing units; and each of said processing units sets a process number in said copy processor register and sets said copy mode flag in a first stage of memory copying processing and then sets, in a second stage, said copy task flag and, after a fixed region of said memory unit is read out by the processor, resets said copy task flag, after which the operations in the second stage are repeated until all regions of the memory unit are read out.

2. A multiplexed computer system, wherein each of said processing units according to claim 1 includes a cache, and after all stored contents of said memory unit are read out by any of said processors or said memory read-out means, stored contents of said cache are written back into said memory unit by the processor and the stored contents of said cache thus written back are transferred to a memory unit of at least one of the other processing unit by said copying means.

3. A multiplexed computer system including a plurality of processing units which carry out the same operation in synchronism with each other, and at least one peripheral unit capable of accessing all of said processing units and wherein each of said processing units includes at least one processor which effects operation processing and a memory unit which is accessible by any of said at least one processor and said at least one peripheral unit, said plurality of processing units being communicable with each other, wherein:

each of said processing units includes memory read-out means for reading out stored contents of said memory unit successively from all regions of said memory unit beginning with a top address or a last address, and copying means for transferring stored contents read out from said memory unit by accesses to said memory unit by said memory read-out means, and for transferring copies of data to be written into said memory unit by accesses to said memory unit by said at least one processor or said at least one peripheral unit to the memory unit or units of at least one other processing unit while maintaining an order of the accesses to its corresponding memory unit;

each of said processing units including a copy address register for indicating an address which indicates an object for copying from said memory unit, and said memory read-out means executes reading out of the stored contents of said memory unit indicated by said copy address register, updates, each time the reading out is completed, the value of said address register to another address to be read out subsequently, and repeats the reading out of the stored contents of said memory unit indicated by said address register and the updating of said address register until all stored contents of said memory unit are read out; and each of said processing units includes a copy mode flag for indicating that memory copying processing for making the stored contents of its own memory unit coincide with the stored contents of the memory unit of at least one other processing unit, and wherein, when said copy mode flag is in a set state, said copying means transfers the stored contents read out from said memory unit by said memory read-out, means and said copies of said data to be written into said memory unit by said at least one processor or said at least one peripheral unit in the same order of the accesses to said at least one memory unit of at least one other processing unit, and if any processor sets, in the memory copying processing, said top address or said last address of said memory unit to said copy address register and sets said copy mode flag, said memory read-out means successively or intermittently repeats reading out of the stored contents of said memory unit until all regions of said memory unit are read out or sets said copy mode flag is reset, and said copying means transfers the stored contents read out, from said memory unit by the accesses to said memory unit by said memory read-out means, and copies of data to be written into said memory unit by the accesses to said memory unit by said at least one processor or said at least one peripheral unit in the same order as that of accesses to the corresponding memory unit or units until all of the regions of said memory unit are read out or said copy mode flag is reset.

4. A multiplexed computer system, wherein each of said processing units according to claim 3 includes a cache, and after all stored contents of said memory unit are read out by any of said processors or said memory read-out means, stored contents of said cache are written back into said memory unit by the processor and the stored contents of said cache thus written back are transferred to a memory unit of at least one of the other processing unit by said copying means.

* * * * *